United States Patent
Maetaki

(10) Patent No.: US 7,394,601 B2
(45) Date of Patent: Jul. 1, 2008

(54) OPTICAL SYSTEM AND OPTICAL APPARATUS INCLUDING THE SAME

(75) Inventor: Satoshi Maetaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/567,401

(22) Filed: Dec. 6, 2006

(65) Prior Publication Data

US 2007/0133100 A1    Jun. 14, 2007

(30) Foreign Application Priority Data

Dec. 8, 2005    (JP)    ............... 2005-354792

(51) Int. Cl.
G02B 13/02    (2006.01)

(52) U.S. Cl. ..................... 359/745; 359/642

(58) Field of Classification Search ............. 359/642, 359/745–748
See application file for complete search history.

(56) References Cited

U.S. PATENT DOCUMENTS

| 4,241,983 A | 12/1980 | Kitagishi |
| 4,348,084 A | 9/1982 | Kitagishi et al. |
| 5,638,215 A | 6/1997 | Neil |
| 5,731,907 A | 3/1998 | Sigler |
| 6,115,188 A | 9/2000 | Nishio et al. |
| 7,046,445 B2 | 5/2006 | Ukuda |
| 7,193,789 B2 * | 3/2007 | Maetaki ............... 359/687 |
| 2004/0042102 A1 | 3/2004 | Ukuda |

FOREIGN PATENT DOCUMENTS

| EP | 1394573 A2 | 3/2004 |
| JP | 55-036886 A | 3/1980 |
| JP | 55-147606 A | 11/1980 |
| JP | 11-119092 A | 4/1999 |

\* cited by examiner

*Primary Examiner*—Scott J Sugarman
(74) *Attorney, Agent, or Firm*—Canon U.S.A. Inc., IP Division

(57) ABSTRACT

An optical system includes an optical member made of a solid material being a mixture prepared by dispersing inorganic particles in a transparent medium. The transparent medium and the inorganic particles of the solid material, and the volume ratio of the inorganic particles to the transparent medium are set so that the optical system can appropriately correct aberrations such as chromatic aberrations.

6 Claims, 12 Drawing Sheets

OPTICAL SYSTEM AND OPTICAL APPARATUS INCLUDING THE SAME

BACKGROUND OF THE INVENTION

1. Field of the Invention

The present invention relates to an optical system and an optical apparatus including the same, such as silver salt film cameras, digital still cameras, video cameras, telescopes, binoculars, projectors, and copying machines.

2. Description of the Related Art

It is desired that optical systems used in image pick-up apparatuses, such as digital cameras and video cameras, have a short optical overall length (length from the lens surface on the most object side to the image plane).

In general, as the size of an optical system is reduced, aberrations (particularly chromatic aberration, such as longitudinal chromatic aberration and lateral chromatic aberration) are liable to degrade the optical performance. In particular, in a telephoto optical system whose optical overall length has been reduced, as the focal length is increased, the occurrence of chromatic aberrations increases.

In order to reduce the occurrence of chromatic aberrations in an optical system, a material having extraordinary partial dispersion is often used as an optical material.

In a telephoto optical system, the chromatic aberrations may be corrected in a unit having front lenses through which paraxial marginal ray and paraxial chief ray pass at a relatively large height from the optical axis. More specifically, the chromatic aberrations are corrected using a lens having a positive refractive power made of a low-dispersion optical material having extraordinary partial dispersion (having a large Abbe number), such as fluorite, and a lens having a negative refractive power made of a high-dispersion optical material.

Such telephoto optical systems have been disclosed in, for example, U.S. Pat. No. 4,241,983 (Japanese Patent Publication No. 60-49883), U.S. Pat. No. 4,348,084 (Japanese Patent Publication No. 60-55805), and U.S. Pat. No. 6,115,188 (Japanese Patent Laid-Open No. 11-119092).

The paraxial marginal ray refers to the paraxial ray that comes parallel to the optical axis of an optical system at a height of 1 from the optical axis with the focal length of the entire optical system normalized to 1. In the following description, the object is described as placed to the left of the optical system, and rays coming into the optical system from the object are described as traveling from left to right.

The paraxial chief ray refers to the paraxial ray that comes at −45° with respect to the optical axis and that passes through the intersection of the entrance pupil and the optical axis of the optical system with the focal length of the optical system normalized to 1. In the following description, the incident angle is defined as being positive when it is in the clockwise direction with respect to the optical axis, and as being negative when it is in the anticlockwise direction.

U.S. Pat. Nos. 5,731,907 and 5,638,215 have disclosed achromatic optical systems using liquid materials exhibiting relatively high dispersion and relatively extraordinary partial dispersion.

In the telephoto optical system using fluorite or the like as an optical material, as disclosed in the foregoing three patent documents, by setting the optical overall length to be relatively large, the chromatic aberrations can be easily corrected. In contrast, a reduced optical overall length can cause chromatic aberrations to occur frequently, and makes it difficult to correct the chromatic aberrations.

This is because this type of telephoto optical system uses an optical material such as fluorite, which has low dispersion and extraordinary partial dispersion, so as to simply reduce the chromatic aberration occurring in the front lens unit with a positive refractive power. In order to correct the chromatic aberrations of an optical system accompanying the reduction of the optical overall length in, for example, a lens system using a low dispersion glass having a high Abbe number, such as fluorite glass, it is necessary to vary the refractive powers at the surfaces of the lenses by a large amount. Accordingly, it is difficult to appropriately correct both the chromatic aberrations and other aberrations occurring by increasing the refractive power, such as spherical aberration, coma, and astigmatism.

The liquid material as disclosed in the above-cited patent documents requires a structure in which it is enclosed. This makes it complicated to manufacture optical systems using such a material. In addition, the liquid material is not sufficiently resistant to the environment and its properties, such as refractive index and dispersion, vary with temperature. Furthermore, the liquid material does not form an interface with air, and it is therefore difficult to correct the chromatic aberrations sufficiently.

SUMMARY OF THE INVENTION

The present invention provides an environment-resistant optical system that can correct aberrations including chromatic aberrations, and that can be easily manufactured.

The optical system includes a solid material being a mixture in which inorganic particles are dispersed in a transparent medium. The optical member has refracting surfaces on the light-incident side and the light-exit side. The solid material satisfies the following expressions:

$$-2.100 \times 10^{-3} \nu \cdot d + 0.693 < \theta gF;$$

$$0.555 < \theta gF < 0.9;$$

$$\nu dp < 35;$$

$$\nu dn < 30; \text{ and}$$

$$Vn < 0.35.$$

In the expression, νdp represents the Abbe number of the transparent medium, νdn represents the Abbe number of the inorganic particles, νd represents the Abbe number of the mixture, θgF represents a partial dispersion ratio of the mixture, and Vn represents the volume ratio of the inorganic particles to the transparent medium.

When a partial dispersion ratio of the mixture is θgd, the mixture may satisfy the following expression:

$$-2.407 \times 10^{-3} \cdot \nu d + 1.420 < \theta gd; \text{ and}$$

$$1.255 < \theta gd < 1.67.$$

In these expressions, the Abbe number νd, the partial dispersion ratios θgF and θgd are defined as follows:

$$\nu d = (Nd-1)/(NF-NC);$$

$$\theta gd = (Ng-Nd)/(NF-NC); \text{ and}$$

$$\theta gF = (Ng-NF)/(NF-NC),$$

where Ng, Nd, NF, and NC represent the refractive indices of the solid material for the g line (wavelength: 435.8 nm), the F line (wavelength: 486.1 nm), the d line (wavelength: 587.6 nm), and the C line (wavelength: 656.3 nm), respectively.

Further features of the present invention will become apparent from the following description of exemplary embodiments with reference to the attached drawings.

DESCRIPTION OF THE EMBODIMENTS

The optical system of the present invention will now be further described using Examples. The optical system of each Example can be used in image pick-up apparatuses, such as digital still or video cameras and silver salt film cameras, observing devices, such as telescopes and binoculars, and optical apparatuses, such as copying machines and projectors.

Figure 1:
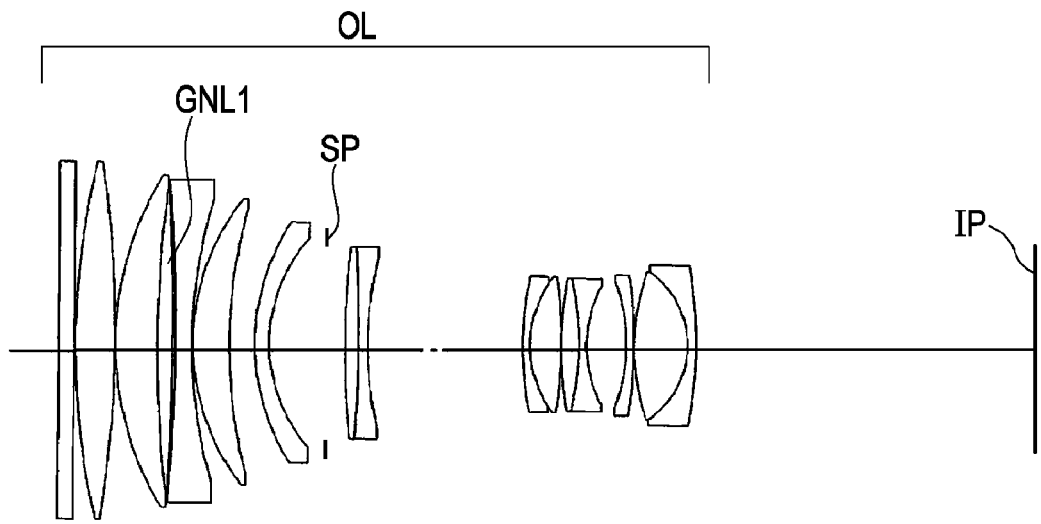
FIG. 1 is a sectional view of an optical system according to Example 1 of the present invention.
Figure 2:
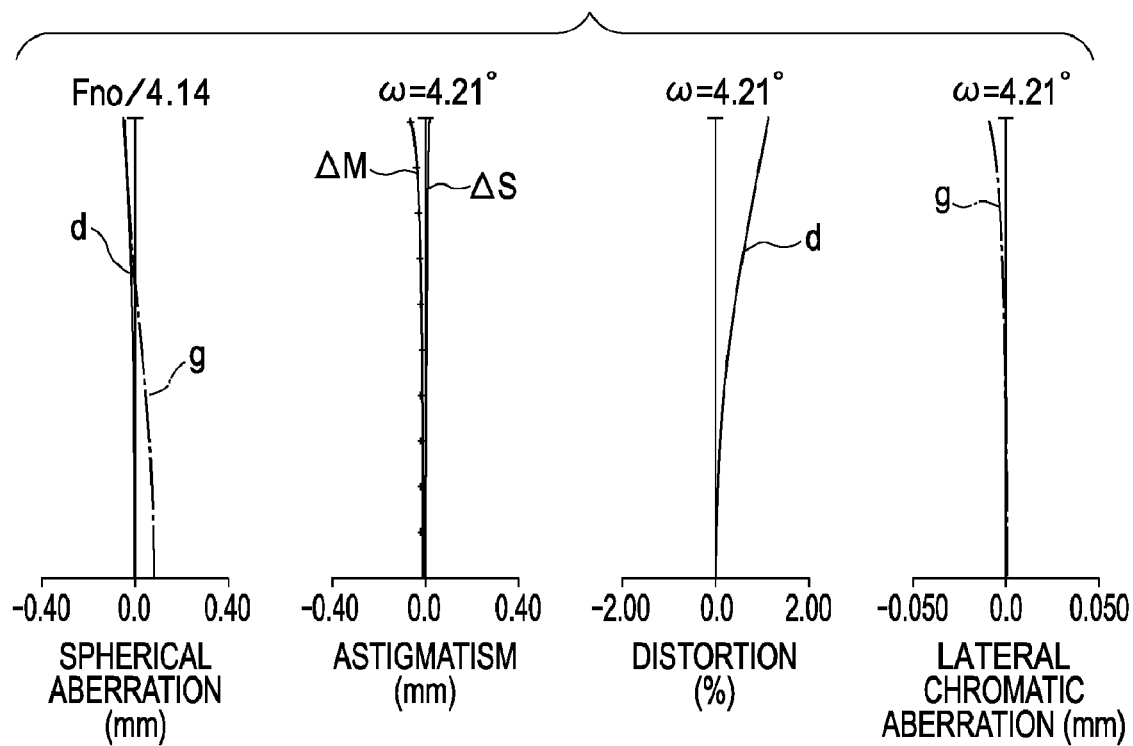
FIG. 2 is graphic representations of aberrations of the optical system of Example 1.

FIG. 1 is a sectional view of lenses of an optical system according to Example 1. FIG. 2 shows aberrations of the optical system of Example 1 that is focused on an infinite distance.

Figure 3:
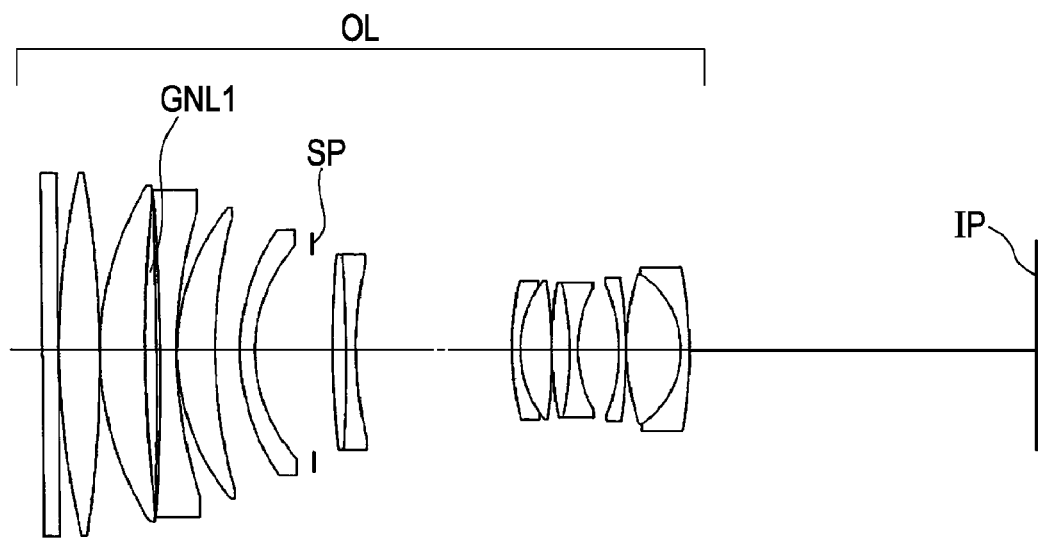
FIG. 3 is a sectional view of an optical system according to Example 2 of the present invention.
Figure 4:
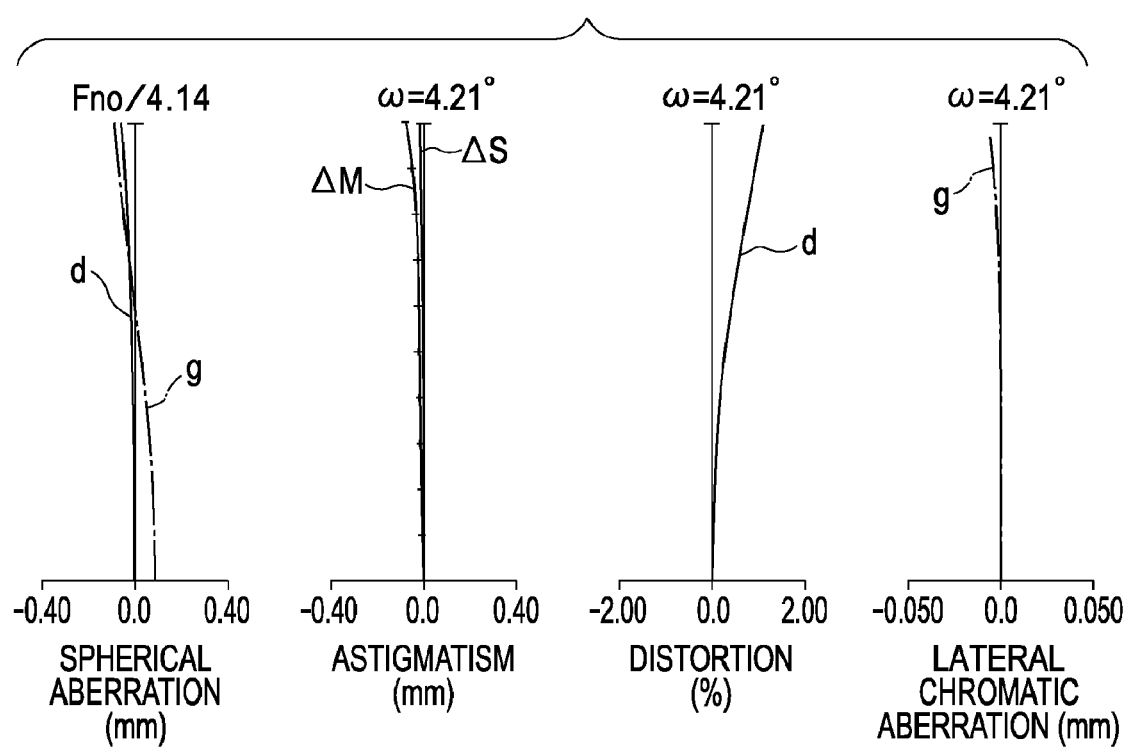
FIG. 4 is graphic representations of aberrations of the optical system of Example 2.

FIG. 3 is a sectional view of lenses of an optical system according to Example 2. FIG. 4 shows aberrations of the optical system of Example 2 that is focused on an infinite distance.

Figure 5:
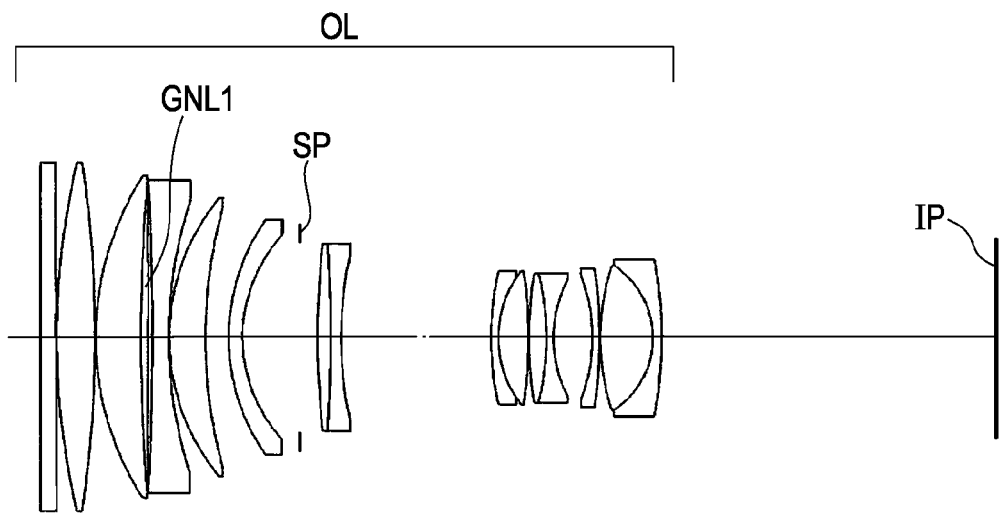
FIG. 5 is a sectional view of an optical system according to Example 3 of the present invention.
Figure 6:
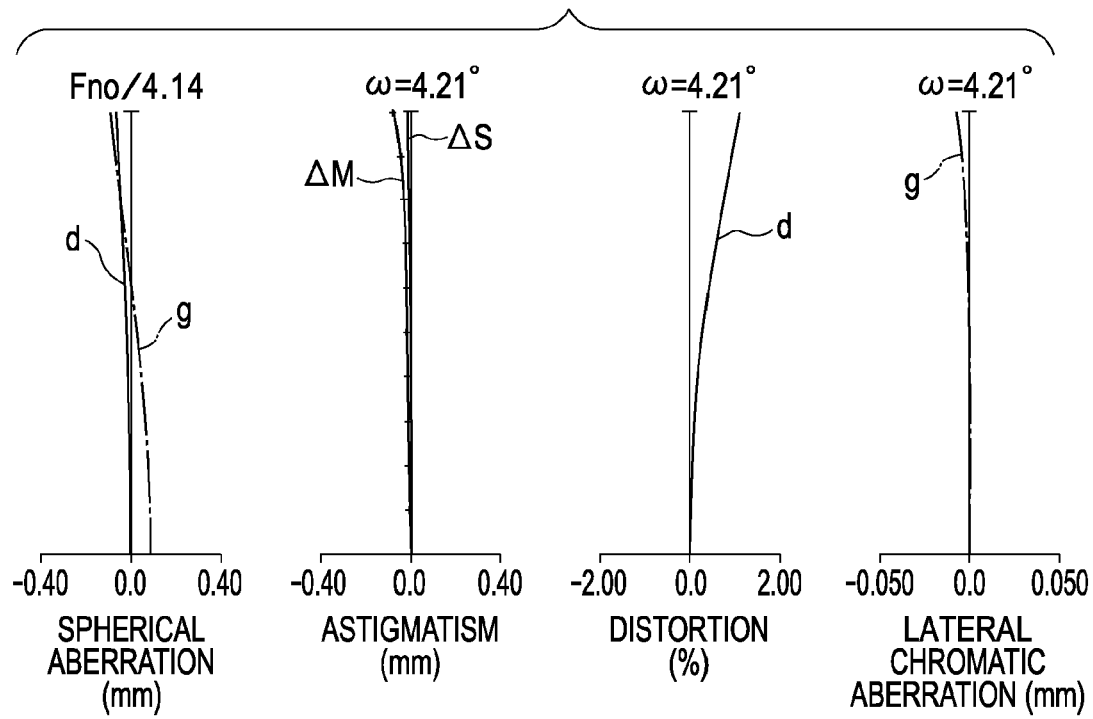
FIG. 6 is graphic representations of aberrations of the optical system of Example 3.

FIG. 5 is a sectional view of lenses of an optical system according to Example 3. FIG. 6 shows aberrations of the optical system of Example 3 that is focused on an infinite distance.

Figure 7:
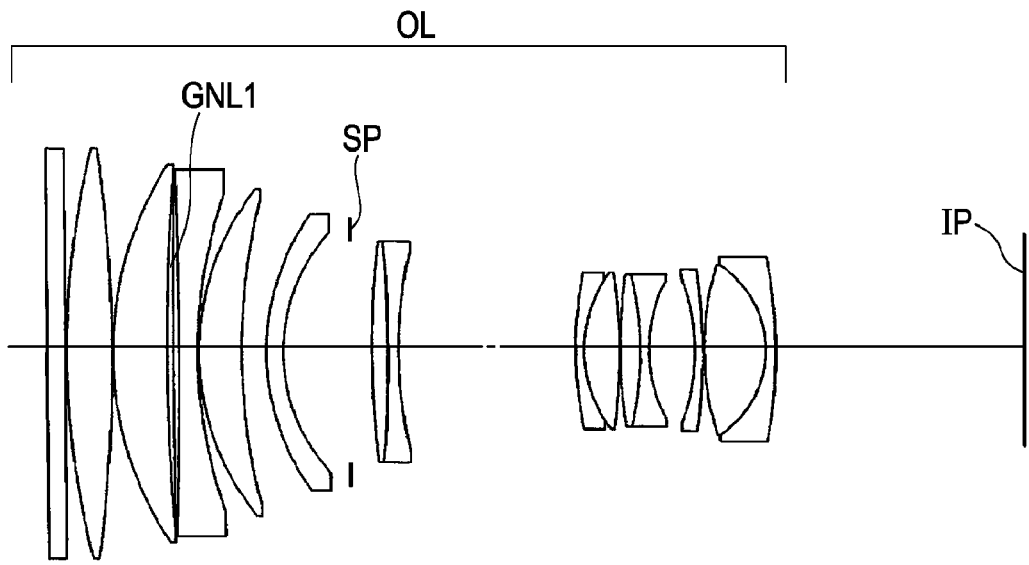
FIG. 7 is a sectional view of an optical system according to Example 4 of the present invention.
Figure 8:
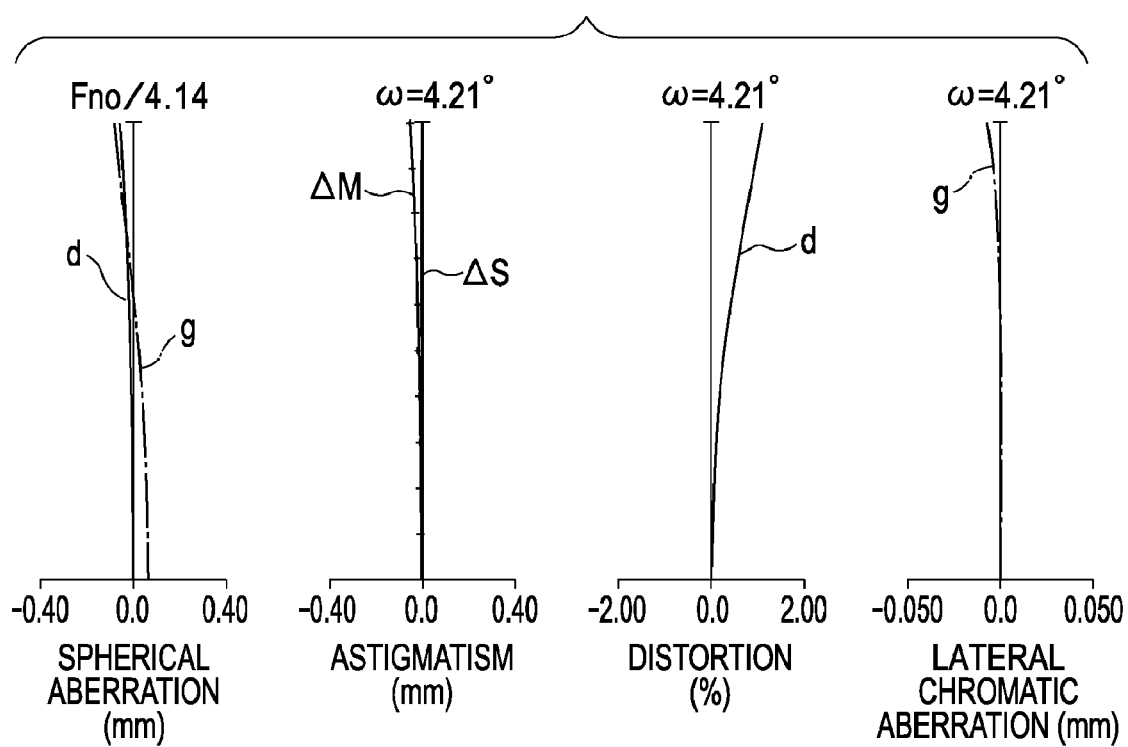
FIG. 8 is graphic representations of aberrations of the optical system of Example 4.

FIG. 7 is a sectional view of lenses of an optical system according to Example 4. FIG. 8 shows aberrations of the optical system of Example 4 that is focused on an infinite distance.

Figure 9:
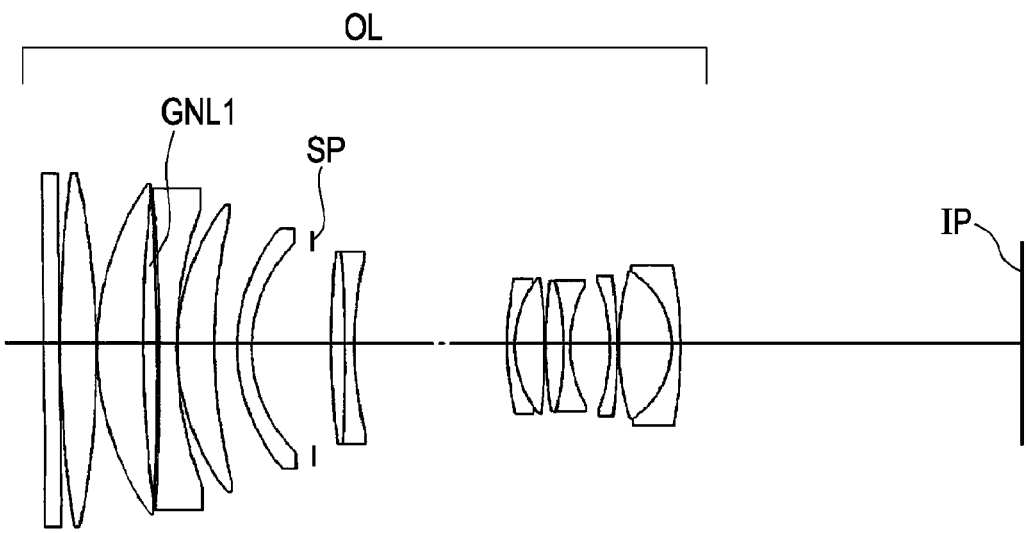
FIG. 9 is a sectional view of an optical system according to Example 5 of the present invention.
Figure 10:
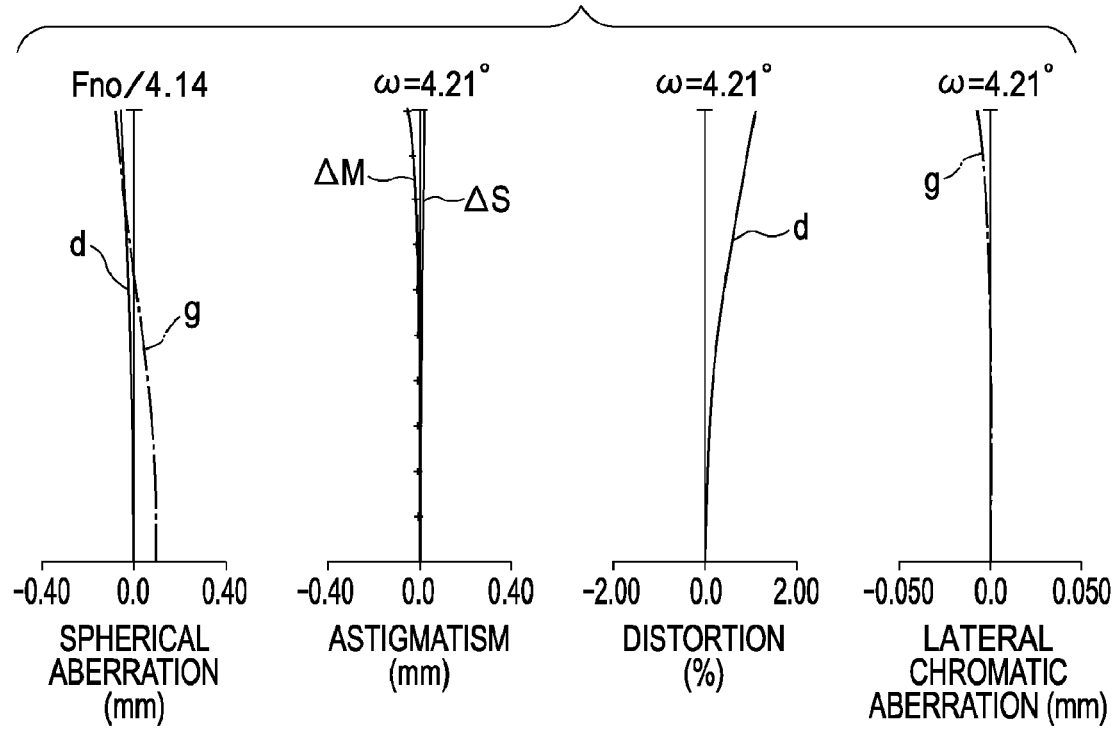
FIG. 10 is graphic representations of aberrations of the optical system of Example 5.

FIG. 9 is a sectional view of lenses of an optical system according to Example 5. FIG. 10 shows aberrations of the optical system of Example 5 that is focused on an infinite distance.

Figure 11:
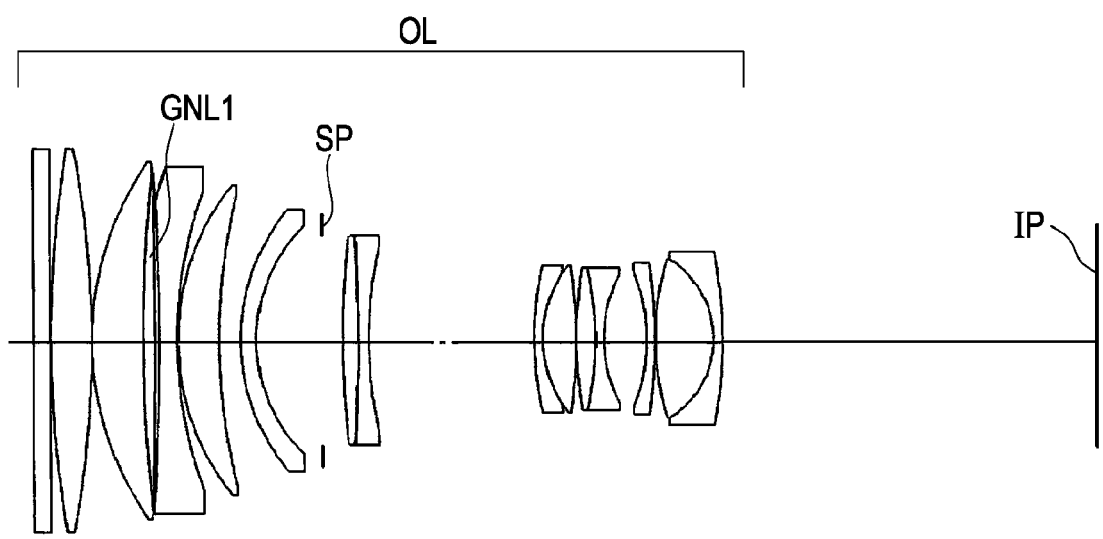
FIG. 11 is a sectional view of an optical system according to Example 6 of the present invention.
Figure 12:
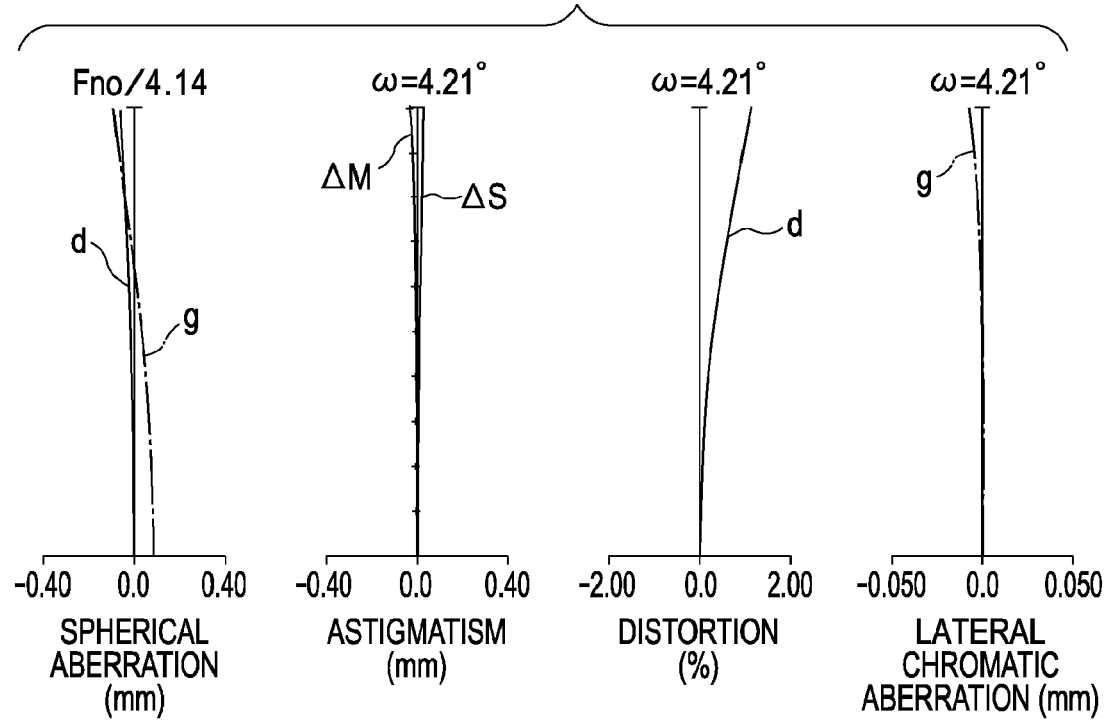
FIG. 12 is graphic representations of aberrations of the optical system of Example 6.

FIG. 11 is a sectional view of lenses of an optical system according to Example 6. FIG. 12 shows aberrations of the optical system of Example 6 that is focused on an infinite distance.

Figure 13:
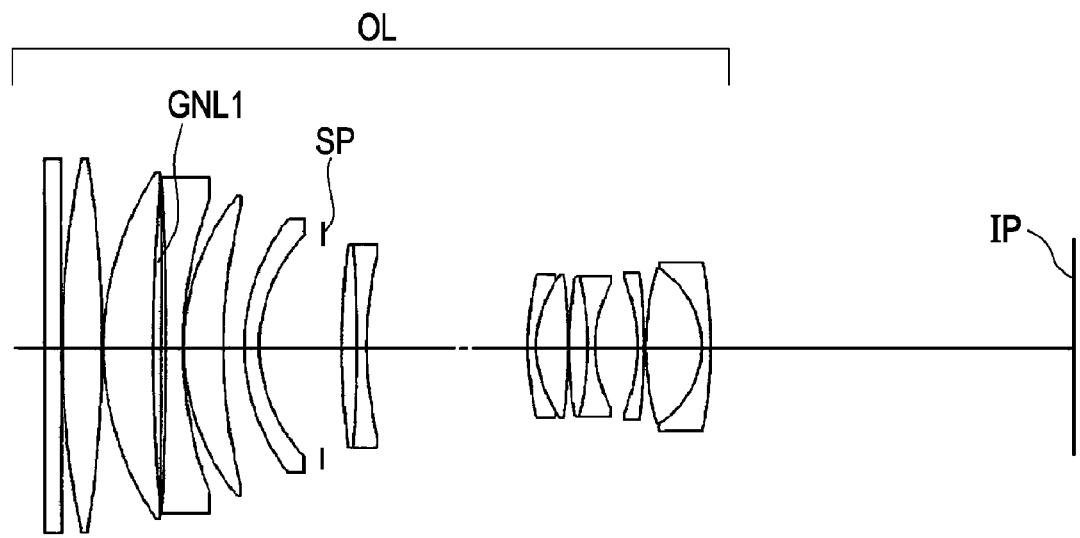
FIG. 13 is a sectional view of an optical system according to Example 7 of the present invention.
Figure 14:
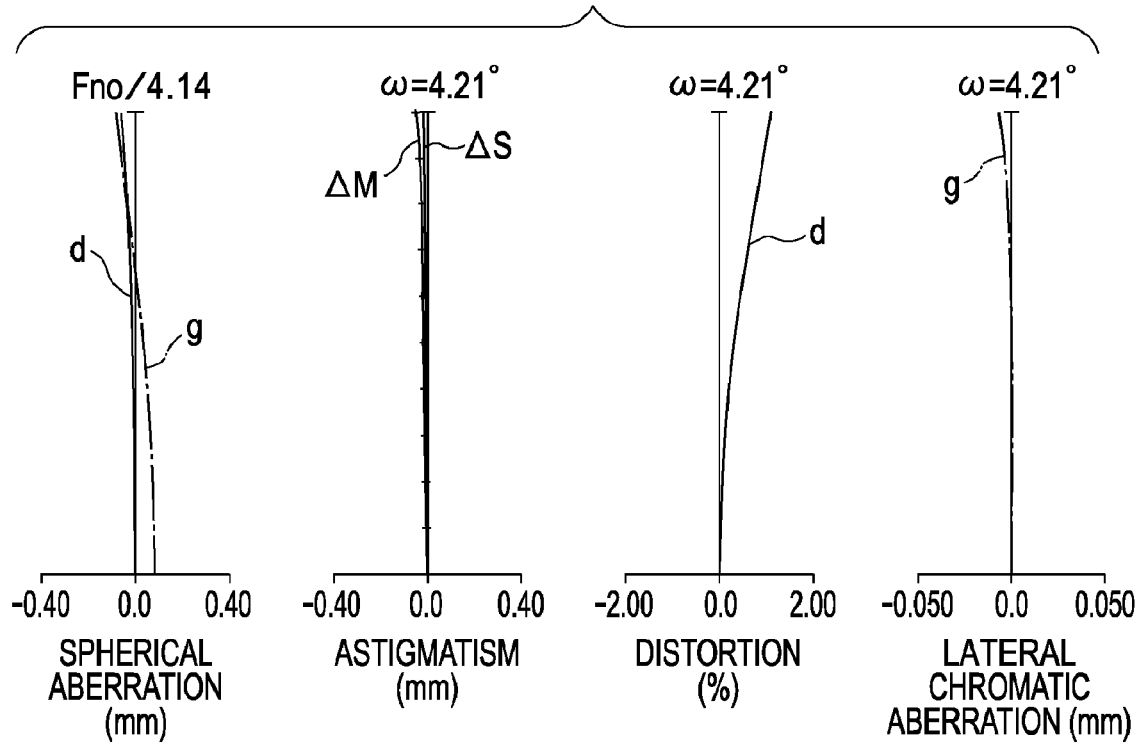
FIG. 14 is graphic representations of aberrations of the optical system of Example 7.

FIG. 13 is a sectional view of lenses of an optical system according to Example 7. FIG. 14 shows aberrations of the optical system of Example 7 that is focused on an infinite distance.

Figure 15:
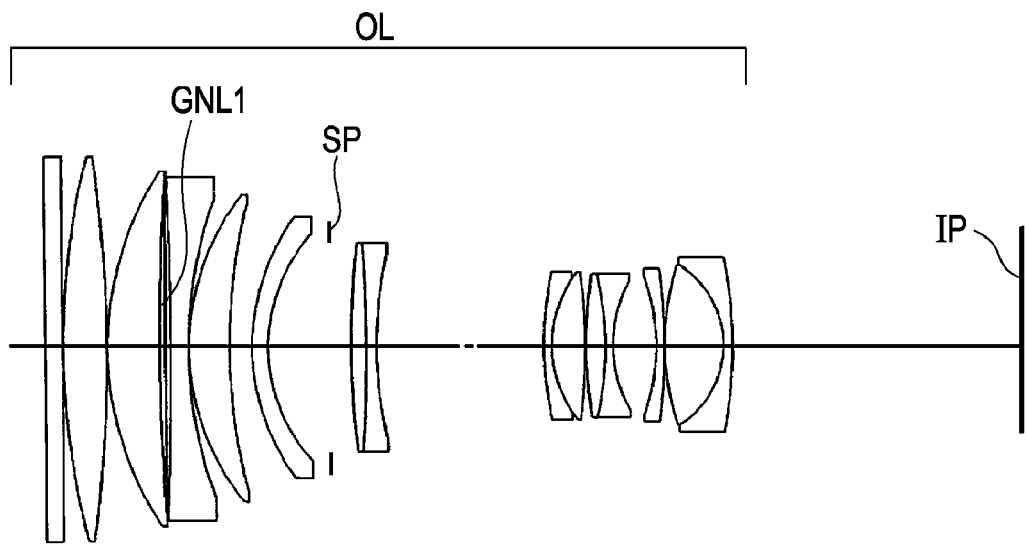
FIG. 15 is a sectional view of an optical system according to Example 8 of the present invention.
Figure 16:
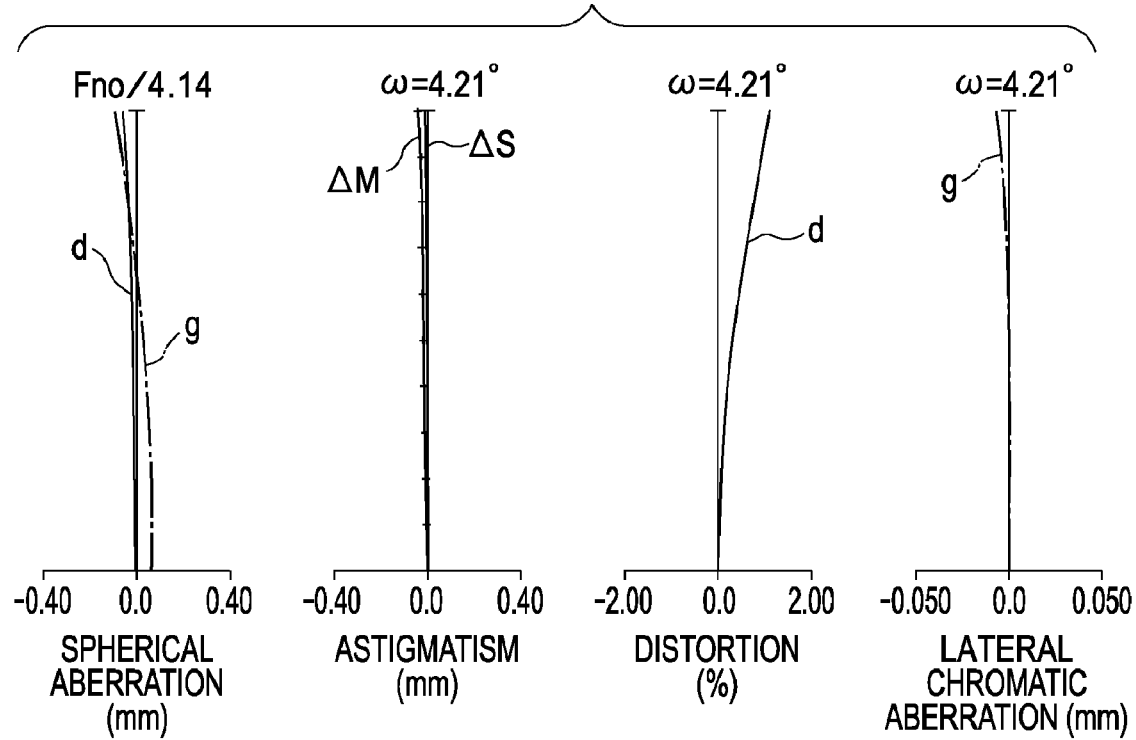
FIG. 16 is graphic representations of aberrations of the optical system of Example 8.

FIG. 15 is a sectional view of lenses of an optical system according to Example 8. FIG. 16 shows aberrations of the optical system of Example 8 that is focused on an infinite distance.

In each sectional view of FIGS. 1, 3, 5, 7, 9, 11, 13, and 15, the front (the object side of an optical shooting system such as a camera, the screen side or enlarged side of a projection optical system such as a liquid crystal projector) is on the left side, and the rear (the image side of the optical shooting system, the display panel side or reduced side of the projection optical system) is on the right side.

In the sectional views of the lenses, OL designates the optical system, GNL1 designates an optical member (lens) made of a solid material described later, SP designates an aperture stop, and IP designates an image plane. When the optical system is used as the optical shooting system of a video camera or a digital still camera, the image plane IP is an image pickup area of a solid image pick-up element (photoelectric conversion element), such as a CCD sensor or a CMOS sensor. When the optical system is used as the optical shooting system of a silver salt film camera, IP is a film surface.

In the graphic representations of aberrations shown in FIGS. 2, 4, 6, 8, 10, 12, 14, and 16, d and g designate the d line and the g line respectively. $\Delta M$ and $\Delta S$ designate a meridional image plane and a sagittal image plane of the d line respectively. Lateral chromatic aberration is expressed by the g line. Fno represents an F number and $\omega$ represents a half-field angle (half angle of view).

Each optical system of the examples includes a refractive optical member made of a solid material having a high dispersion and a high partial dispersion ratio in the optical path. In other wards, the optical member has a refractive power and is made of a solid material having a high dispersion and a high partial dispersion ratio.

The refractive optical member used herein refers to, for example, a refractive lens that produces power by refraction, including no diffractive optical element producing power by diffraction.

The solid material is in a solid state in the environment where the optical system is used, and may be in any state before using the optical system. For example, the solid material may be in a liquid state before manufacture, and the liquid state may be cured into the solid material.

The optical member used in each optical system of the examples has refracting surfaces on the light-incidence side and the light-exit side, and at least one of the refracting surfaces has a refractive power. The solid material is a mixture in which inorganic particles having an Abbe number of νdn are dispersed in a transparent medium having an Abbe number of νdp. The mixture has an Abbe number of νd, and a partial dispersion ratio of θgF. The optical member is made of a material that is in a solid state at normal pressure and temperature and that satisfies the following conditional expressions (1), (2), (3), and (4):

$$-2.100 \times 10^{-3} \cdot \nu d + 0.693 < \theta gF \quad (1)$$

$$0.555 < \theta gF < 0.9 \quad (2)$$

$$\nu dp < 35 \quad (3)$$

$$\nu dn < 30 \quad (4)$$

Each example uses a refractive optical member made of a solid material satisfying conditional expressions (1) and (2) in the optical path, so that chromatic aberrations can be appropriately corrected in a wide range of wavelengths from the g line to the C line.

In addition, the mixture contains high dispersion materials satisfying conditional expressions (3) and (4), so that the thickness of the optical member can be reduced.

The mixture satisfying conditional expressions (1) and (2) may also satisfy the following conditional expressions (5) and (6):

$$-2.407 \times 10^{-3} \cdot \nu d + 1.420 < \theta gd \quad (5)$$

$$1.255 < \theta gd < 1.67 \quad (6)$$

The mixture satisfying conditional expressions (5) and (6) as well as conditional expressions (1) and (2) can correct chromatic aberrations in a wide range of wavelengths between the g line and the d line. Thus, chromatic aberrations can be precisely corrected in a wide range of wavelengths from the g line to the C line.

From the viewpoint of the correction of chromatic aberrations and the preparation of the mixture, it is preferable that the volume ratio Vn of the inorganic particles to the transparent medium satisfy:

$$Vn < 0.35 \quad (7)$$

More preferably, the range of the volume ratio Vn is as follows:

$$0.02 < Vn < 0.32 \quad (7a)$$

The solid material (hereinafter may be referred to as the optical material) satisfying conditional expressions (1), (2), (3), and (4) may be a mixture prepared by dispersing inorganic oxide nanoparticles in a synthetic resin.

Examples of the inorganic particles used herein include inorganic oxides, such as $TiO_2$ (Nd=2.757, νd=9.53), $Nb_2O_5$ (Nd=2.367, νd=14.0), ITO (Nd=1.8581, νd=5.53), $Cr_2O_3$ (Nd=2.2178, νd=13.4), and $BaTiO_3$ (Nd=2.4362, νd=11.3).

Among these inorganic oxides, $TiO_2$ (Nd=2.757, νd=9.53, θgF=0.76) particles are preferably dispersed in a UV curable resin (Nd=1.635, νd=22.7, θgF=0.69) or poly-N-vinylcarbazole (Nd=1.696, νd=17.7, θgF=0.69) at an appropriate volume ratio. Thus, the resulting optical material satisfies conditional expressions (1), (2), (3), and (4).

The optical material is not particularly limited as long as it satisfies conditional expressions (1), (2), (3), and (4).

$TiO_2$ is used for various applications. In the field of optics, $TiO_2$ is used as a vapor deposited material for optical thin films such as antireflection coatings. In other applications, it is used as a photocatalyst and white pigment. $TiO_2$ particles are used for cosmetic preparations.

The $TiO_2$ particles (inorganic oxide nanoparticles) dispersed in the resin have a mean particle size of about 2 to 50 nm in view of scattering. A dispersant may be added to the $TiO_2$ particles to prevent agglomeration.

The medium in which $TiO_2$ is dispersed can be a polymer. The polymer can be shaped with a mold by photopolymerization or thermal polymerization, and is thus suitable for mass-production.

Preferably, the polymer has either a relatively high partial dispersion ratio or a relatively low Abbe number or both. Such polymers include poly-N-vinylcarbazole, styrene, and polymethyl methacrylate (acryl).

In the below-described examples, UV curable resin and poly-N-vinylcarbazole are used as the polymer (host polymer) in which $TiO_2$ particles are dispersed.

However, the host polymer is not limited to these.

The dispersion property (refractive index $N(\lambda)$) of the mixture containing the nanoparticles can be calculated from the following equation derived from the well-known Drude equation.

Specifically, the refractive index $N(\lambda)$ at a wavelength $\lambda$ can be expressed by:

$$N(\lambda) = [1 + V\{N_{TiO}^2(\lambda) - 1\} + (1-V)\{N_P^2(\lambda) - 1\}]^{1/2}$$

In the equation, $\lambda$ represents a used wavelength, $N_{TiO}$ represents the refractive index of $TiO_2$, $N_P$ represents the refractive index of the polymer, and V represents the volume fraction of the $TiO_2$ particles to the polymer.

Preferably, the optical material satisfying conditional expressions (1), (2), (3), and (4) further satisfies the following expression:

$$|dn/dT| < 2.5 \times 10^{-4} (1/^\circ C.) \quad (8)$$

where $|dn/dT|$ represents the absolute value of the change in refractive index of the d line with temperature in the range of 0 to 40° C.

If the $|dn/dT|$ value lies outside the range of conditional expression (8), it becomes difficult to maintain favorable optical characteristics in the range of 0 to 40° C.

In each embodiment, the refractive optical member made of the optical material satisfying conditional expressions (1), (2), (3), and (4) is used as a lens in the optical system or a refractive layer at the surface of the lens.

At least one of the refracting surfaces of the refractive optical member made of the optical material can be aspherical. Thus, chromatic aberration flare, such as spherical aberration of color, can be appropriately corrected. Also, if an interface is formed between the optical member and the atmosphere, such as air, or an optical material having a relatively low refractive index, a relatively large change of chromatic aberrations can be achieved by slightly varying the curvature of the interface.

How aberrations are corrected in an optical system using the refractive optical member having a refractive power made of the optical material having a high partial dispersion ratio will now be described.

In the wavelength dependence of the refractive index (dispersion property) of the optical material, the Abbe number represents the total gradient of the dispersion curve and the partial dispersion ratio represents the degree of curvature of the dispersion curve.

In general, an optical material has a higher refractive index on the short wavelength side than on the long wavelength side (a positive Abbe number), and its dispersion curve has a concave shape (a positive partial dispersion ratio). The changes in refractive index with wavelength become larger as the wavelength is reduced. Also, as the optical material has a lower Abbe number and higher dispersion, the partial dispersion ratio increases, and the concave curvature of the dispersion curve becomes larger.

The curve showing the wavelength dependence of the chromatic aberration coefficient of a lens surface made of an optical material having a high partial dispersion ratio has a larger curvature on the short wavelength side than the case of using an optical material having a low partial dispersion ratio.

On the other hand, the curve showing the wavelength dependence of the chromatic aberration coefficient of a lens surface made of an optical material having a low partial dispersion ratio has a nearly straight shape over the full range of wavelengths.

The partial dispersion ratios of ordinary optical materials have a substantially straight line relationship when plotted against Abbe number. An optical material having characteristics deviating this straight line relationship is an optical material indicating extraordinary partial dispersion characteristics.

For example, low dispersion fluorite has been known as an optical material having extraordinary partial dispersion. However, low dispersion optical materials having extraordinary partial dispersion also exhibit substantially the same changes in partial dispersion ratio against Abbe number.

When an optical material having extraordinary partial dispersion is used as a lens having a refractive power, the curve showing the wavelength dependence of the chromatic aberration coefficient of the lens surface increases the linearity (reduced the partial dispersion ratio) or increases the curvature (increases the partial dispersion ratio) in comparison with the case where an ordinary glass material is used.

In the examples, chromatic aberrations are corrected over the full range of wavelengths by use of a refractive optical member made of an optical material having a higher partial dispersion ratio than ordinary glass materials, selected from among extraordinary partial dispersion materials.

The difference between the use as a lens of an optical material having a lower partial dispersion ratio than ordinary glass materials and the use of an optical material having a higher partial dispersion ratio is that the curve showing the wavelength dependence of the chromatic aberration coefficient at the lens surface increases or decreases the curvature on the short wavelength side respectively.

The curvature on the short wavelength side is due to the curvature of the dispersion curve of the optical material. For the sake of simplicity, optical materials having the same refractive index and Abbe number for the d line will now be described. Assume that three materials are used with the same refractive power: one has a high partial dispersion ratio; another has a normal partial dispersion ratio (ordinary optical material); and the other has a low partial dispersion ratio. When the differences in chromatic aberration coefficient of the three materials between the short wavelength side and the long wavelength side are represented by $\Delta N_H$, $\Delta N_M$, and $\Delta N_L$, the following relationship holds:

$$\Delta N_H > \Delta N_M > \Delta N_L > 0 \quad (a)$$

An optical system including two lenses, one of which is made of an extraordinary partial dispersion material will now be described.

Assume that two lenses having the same refractive power are provided on same axis, one being made of a material having a normal partial dispersion ratio and the other being made of a material having a low partial dispersion ratio. In this instance, the difference in chromatic aberration coefficient of the optical system between the short wavelength side and the long wavelength side is expressed by $\Delta N_M + \Delta N_L$. This value is lower by $\Delta N_M - \Delta N_L$ than the case where materials having normal partial dispersion ratios are used for the two lenses.

In other wards, chromatic aberrations can be reduced in comparison with the case where materials having normal partial dispersion ratios are used for the two lenses.

The case will now be described where the optical system includes a combination of a lens made of a material having a normal partial dispersion ratio and a lens made of a material having a high partial dispersion ratio. The difference in chromatic aberration coefficient of the optical system between the short wavelength side and the long wavelength side is expressed by $\Delta N_M + \Delta N_H$.

This value is higher by $\Delta N_H - \Delta N_M$ than the case where materials having normal partial dispersion ratios are used for the two lenses. This means that if a material having a low partial dispersion ratio, which exhibits small curvature, can reduce chromatic aberrations on the short wavelength side, a material having a high partial dispersion ratio, which exhibits large curvature, increases chromatic aberrations on the short wavelength side. This however applies to the case where a material having a high partial dispersion ratio and a material having a low partial dispersion ratio are used for the same refractive power.

In this state, the sign of the refractive power of the lens made of the material having a high partial dispersion ratio is reversed. In other words, the sign of the refractive power of one of the two lenses is reversed when the lens is made of a material having a high partial dispersion ratio. The material having a high partial dispersion ratio can reduce aberrations on the short wavelength side by $\Delta N_H - \Delta N_M$ in comparison with the case where materials having normal partial dispersion ratios are used for the two lenses.

It is difficult to simultaneously correct both the curvature component and the gradient component of the curve showing the wavelength dependence of the chromatic aberration coefficient over the full range of wavelengths, even if materials having normal partial dispersion ratios are combined. By appropriately using a material having a low partial dispersion ratio that can reduce the curvature component on the short wavelength side more than glass materials having normal partial dispersion ratios, chromatic aberrations can be corrected.

From the viewpoint of reducing chromatic aberrations on the short wavelength side, the same effect can be produced by using a material having a high partial dispersion ratio for a refractive power with an opposite sign to a material having a low partial dispersion ratio.

That the materials having a high partial dispersion ratio and a low partial dispersion ratio are used for different refractive powers means that the lenses produce opposite effects even in the range of wavelengths outside the short wavelength side.

For balancing, other glass materials of the optical system are selected in a reversed manner.

This will now be further described in detail using an achromatic effect in a telephoto lens system including a refractive optical part GNL made of a material having a high partial dispersion ratio and a refractive optical part G made of a material having a normal partial dispersion ratio.

The telephoto lens system includes a front lens unit having a positive refractive power and a rear lens unit having a negative refractive power in order from the object side to the image side. The telephoto lens system has an optical overall length shorter than the focal length.

A negative lens constituting the refractive optical part G is made of material having a relatively high partial dispersion ratio in comparison with the state where chromatic aberrations of the refractive optical part G are corrected to some extent.

In general, a material having a high partial dispersion ratio also has high dispersion. Accordingly, the curve showing the wavelength dependence of the chromatic aberration coefficient of the refractive optical part G changes in total gradient while increasing the curvature.

In this state, a refractive power is given to the refractive optical part GNL and the positive lens constituting the refractive optical part G is made of a material having a relatively high dispersion.

In the case where the refractive optical part GNL is made of an ordinary optical material exhibiting a constant partial dispersion ratio against Abbe number, however, the refractive optical part GNL simultaneously contributes to the curvature component and the gradient component of the wavelength dependence of the aberration coefficient of the refractive optical part G to the same extent. Therefore these components cannot be simultaneously cancelled.

On the other hand, in the case where the refractive optical part GNL is made of a material having a higher partial dispersion ratio than ordinary materials, the refractive optical part GNL mainly contributes to the curvature component of the entire curve showing the wavelength dependence of the chromatic aberration of the refractive optical part G. Hence, only the curvature component can be cancelled.

As a result, the refractive optical part GNL can mainly cancel only the curvature component of the wavelength dependence of the chromatic aberration of the refractive optical part G, while the positive lens of the refractive optical part G cancels only the gradient component.

If the refractive optical part GNL has a small absolute value of Abbe number, that is, has a high dispersion, chromatic aberrations can be advantageously corrected independently. This will be further described using the longitudinal chromatic aberration coefficient and lateral chromatic aberration coefficient at a surface of a lens.

When the change in refractive power at the surface of a refractor lens is $\Delta\psi$, the change $\Delta L$ in longitudinal chromatic aberration coefficient and the change $\Delta T$ in lateral chromatic aberration coefficient, at the surface of the lens are expressed by:

$$\Delta L \propto \Delta\psi/\nu \quad \text{(b)}$$

$$\Delta T \propto \Delta\psi/\nu \quad \text{(c)}$$

As is clear from expressions (b) and (c), the changes $\Delta L$ and $\Delta T$ in longitudinal and lateral chromatic aberration coefficients for the change $\Delta\psi$ in refractive power at the lens surface increase as the absolute value of Abbe number $\nu$ is reduced (that is, as the dispersion increases).

Therefore, by using a material having a small absolute value of Abbe number $\nu$, or having a high dispersion, the change in refractive power to obtain a desired chromatic aberration can be small.

This means in aberration theory that chromatic aberration can be controlled without largely affecting other aberration, such as spherical aberration, coma, and astigmatism, and that the independence in correcting the chromatic aberrations is enhanced.

In contrast, use of a material having a low dispersion (or having a high Abbe number $\nu$) increases the change in refractive power to obtain a desired chromatic aberration. Accordingly, spherical aberration and other aberrations are largely changed and the independence in correcting the chromatic aberrations is reduced. In order to correct aberrations, it is important that at least one lens surface of the lenses constituting the optical system is defined by a refractor lens made of a high dispersion material.

The refractive optical part GNL is used in combination with an ordinary optical material. Accordingly, the material of the refractive optical part GNL needs to have a different partial dispersion ratio from ordinary optical materials, but an excessively large difference is not suitable.

If a lens made of a material having a partial dispersion ratio largely different from that of ordinary optical materials is used, the curvature of the curve showing the wavelength dependence of the chromatic aberration coefficient at the surface of the lens is particularly increased on the short wavelength side. In order to cancel the increased curvature, the refractive powers of other lenses need to be enhanced. Eventually, aberrations, such as spherical aberration, coma, and astigmatism, are largely affected, and become difficult to correct.

It is thus important that the material of the refractive optical part GNL has a higher partial dispersion ratio than ordinary optical materials, and that the partial dispersion ratio is not excessively different from that of the ordinary optical materials.

Conditional expressions (1) and (2) specified for the optical systems of the examples represent the relationship between the Abbe number $\nu d$ and the partial dispersion ratio $\theta gF$ to correct the chromatic aberrations appropriately on the basis of the above-described principle.

In order to correct the chromatic aberrations more appropriately, the numerical range of conditional expression (1) can be set as follows:

$$-2.100 \times 10^{-3} \cdot \nu d + 0.693 < \theta gF < -1.231 \times 10^{-3} \cdot \nu d + 0.900 \quad (1a)$$

Preferably, the range can be set as follows:

$$-2.100 \times 10^{-3} \cdot \nu d + 0.693 < \theta gF < -1.389 \times 10^{-3} \cdot \nu d + 0.823 \quad (1b)$$

More preferably, the range can be set as follows:

$$-1.682 \times 10^{-3} \cdot \nu d + 0.700 < \theta gF < -1.682 \times 10^{-3} \cdot \nu d + 0.756 \quad (1c)$$

While conditional expression (1), (1a), (1b), or (1c) holds, the numerical range of conditional expression (2) can be set as follows, so that the chromatic aberration can be more appropriately corrected:

$$0.555 < \theta gF < 0.86 \quad (2a)$$

Preferably, the range can be set as follows:

$$0.555 < \theta gF < 0.80 \quad (2b)$$

In order to correct the chromatic aberration more appropriately, the numerical range of conditional expression (5) can be set as follows:

$$-2.407 \times 10^{-3} \cdot \nu d + 1.420 < \theta gd < -1.152 \times 10^{-3} \cdot \nu d + 1.651 \quad (5a)$$

Preferably, the range can be set as follows:

$$-2.407 \times 10^{-3} \cdot \nu d + 1.420 < \theta gd < -1.865 \times 10^{-3} \cdot \nu d + 1.572 \quad (5b)$$

More preferably, the range can be set as follows:

$$-2.076 \times 10^{-3} \cdot \nu d + 1.426 < \theta gd < -2.076 \times 10^{-3} \cdot \nu d + 1.512 \quad (5c)$$

While conditional expression (5), (5a), (5b), or (5c) holds, the numerical range of conditional expression (6) can be set as follows to correct the chromatic aberration more appropriately:

$$1.255 < \theta gd < 1.61 \quad (6a)$$

Preferably, the range can be set as follows:

$$1.255 < \theta gd < 1.54 \quad (6b)$$

The relationship among the lens thickness, the Abbe number, and the partial dispersion ratio will now be described.

The refracting surface of the refractive optical part GNL has a refractive power $\psi$. In order to correct the chromatic aberration appropriately, the relationship among the refractive power $\psi$, the Abbe number $\nu$, and the partial dispersion ratio $\theta$ can be as follows:

$$\psi \propto \nu/\Delta\theta \quad (d)$$

In the expression (d), $\Delta\theta$ represents the difference in partial dispersion ratio at the same Abbe number between the refractive optical part GNL and an ordinary glass material. $\Delta\theta$ is also used as a value representing a property of the ordinary glass material, and is generally expressed as a difference from the standard line, as follows:

$$\Delta\theta gF = \theta gF(GNL) - (0.6438 - 1.682 \times 10^{-3} \cdot \nu d) \quad (e)$$

$$\Delta\theta gd = \theta gd(GNL) - (1.3647 - 2.076 \times 10^{-3} \cdot \nu d) \quad (f)$$

where $\theta gF(GNL)$ and $\theta gd(GNL)$ represent partial dispersion ratios of the refractive optical parts GNL.

Equation (d) clearly shows that the refractive power $\psi$ of the refractive optical part GNL decreases as the Abbe number $\nu$ decreases (the dispersion increases) or as the difference $\Delta\theta$ in partial dispersion ratio increases.

In an optical system, as the refractive power of the lens decreases, the central thickness of the lens along the optical axis (central thickness along the optical axis for a positive lens, peripheral thickness along the optical axis for a negative lens) decreases. In order to reduce the thickness of the lens, the lens has a high dispersion and a large difference $\Delta\theta$ in partial dispersion ratio.

A mixture is available which satisfies conditional expressions (1) and (2) and which is prepared by dispersing some resins or inorganic oxide nanoparticles as high dispersion optical materials in a synthetic resin.

In order to obtain a higher dispersion material, however, it is preferable to disperse inorganic oxide nanoparticles having a higher dispersion in a synthetic resin inherently having a high dispersion. According to this principle, conditional expressions (3) and (4) are given to obtain a high dispersion optical material by dispersing inorganic oxide nanoparticles in a synthetic resin.

In order to obtain an optical material having a higher dispersion, the range of vdp expressed by conditional expression (3) can be as follows:

$$\nu dp < 30 \quad (3a)$$

Preferably, the range is set as follows:

$$\nu dp < 25 \quad (3b)$$

More preferably, the range can be set as follows:

$$\nu dp < 20 \quad (3c)$$

In order to obtain an optical material having a higher dispersion, the range of vdn expressed by conditional expression (4) can be as follows:

$$\nu dn < 25 \quad (4a)$$

Preferably, the range can be set as follows:

$$\nu dn < 20 \quad (4b)$$

More preferably, the range can be set as follows:

$$\nu dn < 15 \quad (4c)$$

The proportions of the inorganic oxide nanoparticles and the synthetic resin in the mixture will now be described. Since resin and inorganic oxide nanoparticles generally have different characteristics from each other, the difference $\Delta\theta$ in partial dispersion ratio is changed by varying the mixing ratio of the inorganic oxide nanoparticles to the synthetic resin. A large difference $\Delta\theta$ in partial dispersion ratio allows the reduction of the lens thickness, as described above.

However, since the chromatic aberrations are corrected in combination with other glass materials, an excessively large difference $\Delta\theta$ in partial dispersion ratio makes it difficult to produce favorable characteristics. In contrast, a small difference $\Delta\theta$ in partial dispersion ratio makes it difficult to correct the chromatic aberrations. It is therefore preferable that the inorganic oxide nanoparticles be dispersed in the synthetic resin so that the difference $\Delta\theta$ in partial dispersion ratio is in a certain range.

The higher the volume ratio Vn of the inorganic oxide nanoparticles to the synthetic resin is, the higher dispersive power the optical material has. Accordingly, the thickness of the lens can be reduced. However, if the volume ratio Vn of the inorganic oxide nanoparticles is increased, the change in Abbe number $\nu$ is reduced and the change in lens thickness against the volume ratio Vn is also reduced.

Figure 17:
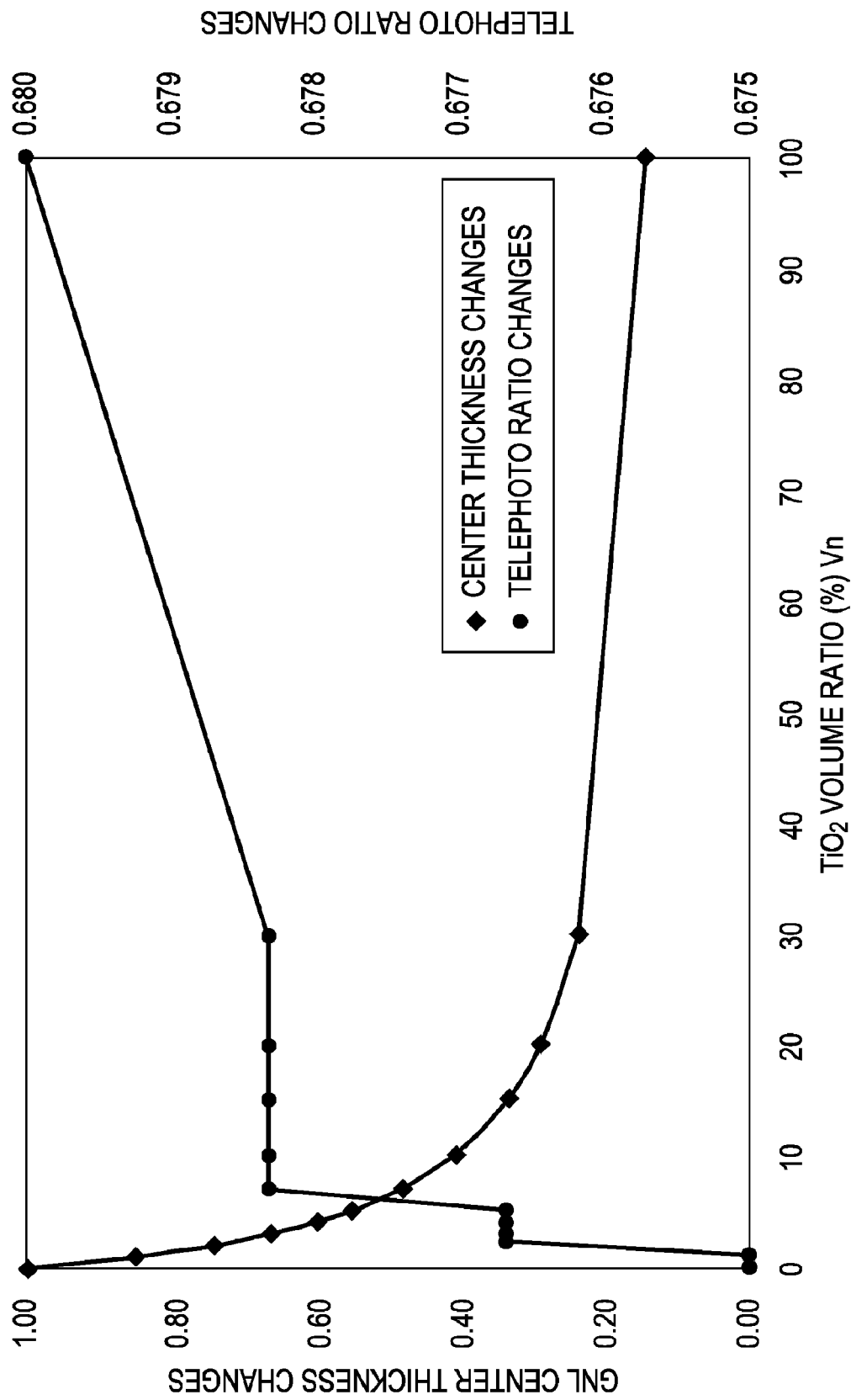
FIG. 17 is a plot showing the effect of reducing lens thickness.

FIG. 17 is a graphic representation showing the changes in lens thickness with the volume ratio Vn. A refractive optical part GNL made of a mixture prepared by dispersing inorganic oxide nanoparticles in a synthetic resin was used for a telephoto lens with a focal length of 300 mm. FIG. 17 shows the relationship between the volume ratio Vn of the inorganic oxide nanoparticles and the central thickness of the refractive optical part GNL.

In this instance, $TiO_2$ particles (Nd=2.757, vd=9.53, $\theta gF$=0.76) were used as the inorganic oxide particles, and a UV curable resin (Nd=1.635, vd=22.7, $\theta gF$=0.69) was used as the transparent medium, or the synthetic resin.

In FIG. 17, the vertical axis represents the thickness ratio of the refractive optical part GNL with a $TiO_2$ volume ratio Vn to a refractive optical part GNL with a $TiO_2$ volume ratio Vn of 0, and the horizontal axis represents the $TiO_2$ volume ratio Vn. FIG. 17 shows that the thickness of the refractive optical part GNL decreases as the $TiO_2$ volume ratio Vn is increased, and that the degree of changes in thickness becomes small gradually, particularly when the $TiO_2$ volume ratio Vn is 30% or more.

FIG. 17 also shows the changes in telephoto ratio of the entire optical system against the volume ratio Vn. The optical overall length of this optical system is reduced by appropriately correcting the chromatic aberrations with the refractive optical part GNL. The changes in telephoto ratio represent the ability of the refractive optical part GNL to correct the chromatic aberrations, and this ability increases as the telephoto ratio is reduced. FIG. 17 shows that as the $TiO_2$ volume ratio Vn is increased, the telephoto ratio increases, that is, the ability of the refractive optical part GNL to correct the chromatic aberrations is reduced.

If the volume ratio Vn of inorganic oxide nanoparticles dispersed in the synthetic resin is excessively increased, the particles become liable to agglomerate. The agglomerate of the particles used as an optical material disadvantageously causes scattering of light.

According to the above description, conditional expression (7) represents a requirement for an optical material that has the effect of reducing the thickness of the refractive optical part GNL, the ability to correct the chromatic aberration, and the effect of appropriately controlling the agglomeration of the particles.

In order to obtain much better optical material, the range of Vn expressed by conditional expression (7) can be as follows:

$$0.03 < Vn < 0.2 \quad (7b)$$

More preferably, the range can be set as follows:

$$0.03 < Vn < 0.15 \quad (7c)$$

Examples of the optical system will now be described which uses an optical member made of an optical material satisfying conditional expressions (1), (2), (3), and (4). In the examples, the optical material satisfying the conditional expressions is a $TiO_2$ particle-dispersed material prepared by dispersing $TiO_2$ in a UV curable resin or poly-N-vinylcarbazole acting as a host polymer.

The optical constants of the optical materials ($TiO_2$ particle-dispersed materials) used in Numerical Examples 1 to 8 corresponding to the below-described Examples 1 to 8 are show in Table 1. The optical constants of the UV curable resin, poly-N-vinylcarbazole, and $TiO_2$ are shown independently in Table 2.

Features of the Examples will now be described.

In Numerical Example 1 of the optical system (telephoto lens system) shown in FIG. 1, a lens of the telephoto lens system with a focal length of 300 mm is made of a material prepared by dispersing 3% by volume of $TiO_2$ particles in a UV curable resin. In FIG. 1, the lens (layer) made of this $TiO_2$ particle-dispersed material is designated by GNL1.

In the optical system of Numerical Example 1, the lens GNL1, which is made of the $TiO_2$ particle-dispersed material, is a refractive optical member disposed on the object side where paraxial marginal ray passes at a relatively large height from the optical axis. The lens GNL1 made of the $TiO_2$ particle-dispersed material has a positive refractive power. The lens GNL1 mainly corrects the longitudinal chromatic aberration.

The optical system of Numerical Example 1 is a very compact telephoto lens system with a telephoto ratio of 0.677. The central thickness of the lens GNL1 is about 3.1 mm, which is about 66% of the thickness of a lens made of a material not containing $TiO_2$ particles.

In Numerical Example 2 of the optical system (telephoto lens system) shown in FIG. 3, a lens of the telephoto lens system with a focal length of 300 mm is made of a mixture prepared by dispersing 7% by volume of $TiO_2$ particles in a UV curable resin. In FIG. 3, the lens (layer) made of this $TiO_2$ particle-dispersed material is designated by GNL1.

In the optical system of Numerical Example 2, the lens GNL1, which is made of the $TiO_2$ particle-dispersed material, is disposed on the object side where paraxial marginal ray passes at a relatively large height from the optical axis. The lens GNL1 made of the $TiO_2$ particle-dispersed material has a positive refractive power. The lens GNL1 mainly corrects the longitudinal chromatic aberration. The optical system of Numerical Example 2 is a very compact telephoto lens system with a telephoto ratio of 0.678. The central thickness of the lens GNL1 is about 2.3 mm, which is about 48% of the thickness of a lens made of a material not containing $TiO_2$ particles.

In Numerical Example 3 of the optical system (telephoto lens system) shown in FIG. 5, a lens of the telephoto lens with a focal length of 300 mm is made of a mixture prepared by dispersing 15% by volume of $TiO_2$ particles in a UV curable resin. In FIG. 5, the lens (layer) made of this $TiO_2$ particle-dispersed material is designated by GNL1.

In the optical system of Numerical Example 3, the lens GNL1, which is made of the $TiO_2$ particle-dispersed material, is disposed on the object side where paraxial marginal ray passes at a relatively large height from the optical axis. The lens GNL1 made of the $TiO_2$ particle-dispersed material has a positive refractive power. The lens GNL1 mainly corrects the longitudinal chromatic aberration. The optical system of Numerical Example 3 is a very compact telephoto lens system with a telephoto ratio of 0.678. The central thickness of the lens GNL1 is about 1.6 mm, which is about 33% of the thickness of a lens made of a material not containing $TiO_2$ particles.

In Numerical Example 4 of the optical system (telephoto lens system) shown in FIG. 7, a lens of the telephoto lens system with a focal length 300 mm is made of a mixture prepared by dispersing 30% by volume of $TiO_2$ particles in a UV curable resin. In FIG. 7, the lens (layer) made of this $TiO_2$ particle-dispersed material is designated by GNL1.

In the optical system of Numerical Example 4, the lens GNL1, which is made of the $TiO_2$ particle-dispersed material, is disposed on the object side where paraxial marginal ray passes at a relatively large height from the optical axis. The lens GNL1 made of the $TiO_2$ particle-dispersed material has a positive refractive power. The lens GNL1 mainly corrects the longitudinal chromatic aberration. The optical system of Numerical Example 4 is a very compact telephoto lens system with a telephoto ratio of 0.678. The central thickness of the lens GNL1 is about 1.1 mm, which is about 23% of the thickness of a lens made of a material not containing $TiO_2$ particles.

In Numerical Example 5 of the optical system (telephoto lens system) shown in FIG. 9, a lens of the telephoto lens system with a focal length of 300 mm is made of a mixture prepared by dispersing 3% by volume of $TiO_2$ particles in poly-N-vinylcarbazole. In FIG. 9, the lens (layer) made of the $TiO_2$ particle-dispersed material is designated by GNL1.

In the optical system of Numerical Example 5, the lens GNL1, which is made of the $TiO_2$ particle-dispersed material, is disposed on the object side where paraxial marginal ray passes at a relatively large height from the optical axis. The lens GNL1 made of the $TiO_2$ particle-dispersed material has a positive refractive power. The lens GNL1 mainly corrects the longitudinal chromatic aberration. The optical system of Numerical Example 5 is a very compact telephoto lens system with a telephoto ratio of 0.685. The central thickness of the lens GNL1 is about 3.0 mm, which is about 72% of the thickness of a lens made of a material not containing $TiO_2$ particles.

In Numerical Example 6 of the optical system (telephoto lens system) shown in FIG. 11, a lens of the telephoto lens system with a focal length of 300 mm is made of a mixture prepared by dispersing 7% by volume of $TiO_2$ particles in poly-N-vinylcarbazole. In FIG. 11, the lens (layer) made of the $TiO_2$ particle-dispersed material is designated by GNL1.

In the optical system of Numerical Example 6, the lens GNL1, which is made of the $TiO_2$ particle-dispersed material, is disposed on the object side where paraxial marginal ray passes at a relatively large height from the optical axis. The lens GNL1 made of the $TiO_2$ particle-dispersed material has a positive refractive power. The lens GNL1 mainly corrects the longitudinal chromatic aberration. The optical system of Numerical Example 6 is a very compact telephoto lens system with a telephoto ratio of 0.683. The central thickness of the lens GNL1 is about 2.2 mm, which is about 54% of the thickness of a lens made of a material not containing $TiO_2$ particles.

In Numerical Example 7 of the optical system (telephoto lens system) shown in FIG. 13, a lens of the telephoto lens system with a focal length of 300 mm is made of a mixture prepared by dispersing 15% by volume of TiO₂ particles in poly-N-vinylcarbazole.

In FIG. 13, the lens (layer) made of the TiO₂ particle-dispersed material is designated by GNL1.

In the optical system of Numerical Example 7, the lens GNL1, which is made of the TiO₂ particle-dispersed material, is disposed on the object side where paraxial marginal ray passes at a relatively large height from the optical axis. The lens GNL1 made of the TiO₂ particle-dispersed material has a positive refractive power. The lens GNL1 mainly corrects the longitudinal chromatic aberration. The optical system of Numerical Example 7 is a very compact telephoto lens system with a telephoto ratio of 0.682. The central thickness of the lens GNL1 is about 1.6 mm, which is about 38% of the thickness of a lens made of a material not containing TiO₂ particles.

In Numerical Example 8 of the optical system (telephoto lens system) shown in FIG. 15, a lens of the telephoto lens system with a focal length of 300 mm is made of a mixture prepared by dispersing 30% by volume of TiO₂ particles in poly-N-vinylcarbazole. In FIG. 15, the lens (layer) made of the TiO₂ particle-dispersed material is designated by GNL1.

In the optical system of Numerical Example 8, the lens GNL1, which is made of the TiO₂ particle-dispersed material, is disposed on the object side where paraxial marginal ray passes at a relatively large height from the optical axis. The lens GNL1 made of the TiO₂ particle-dispersed material has a positive refractive power. The lens GNL1 mainly corrects the longitudinal chromatic aberration. The optical system of Numerical Example 8 is a very compact telephoto lens with a telephoto ratio of 0.680. The central thickness of the lens GNL1 is about 1.1 mm, which is about 27% of the thickness of a lens made of a material not containing TiO₂ particles.

Specific data of Numerical Examples 1 to 8 will be shown below. In each Numerical Example, i represents the number of lens surface counted from the object side. Ri represents the radius of curvature of the i-th lens surface (the i-th surface); Di represents the distance between the i-th surface and the (i+1)-th surface; and Ni and νi respectively represent the refractive index and the Abbe number of the i-th optical member (except the lens or layer made of a resin or TiO₂ particle-dispersed material) for the d line. The refractive index and the Abbe number of the lens GNLj for the d line are separately shown as NGNLj and νGNLj (j=1, 2, ...) respectively. f Represents the focal length; Fno represents the F number; and ω represents the half-field angle.

Aspherical shapes are expressed by:

$$x(h) = \frac{(1/R)h^2}{1 + \sqrt{\{1 - (1+k)(h/R)^2\}}} + Bh^4 + Ch^6 + Dh^8 + Eh^{10} \ldots$$

where x represents the displacement from the surface vertex in the optical axis direction; h represents the height from the optical axis in the direction perpendicular to the optical axis; R represents the paraxial radius of curvature; k represents the conic constant; and B, C, D, E, ... are aspherical coefficients at respective orders.

"E±XX" in each aspherical coefficient represents "×10^±XX".

Numerical Examples 1 to 4 each use a lens made of a solid material prepared by dispersing 3% to 30% by volume of TiO₂ in the UV curable resin acting as the host polymer. Numerical Examples 5 to 8 each use a lens made of a solid material prepared by dispersing 3% to 30% by volume of TiO₂ in poly-N-vinylcarbazole acting as the host polymer. The refractive indices of these TiO₂ particle-dispersed materials are calculated from the above-mentioned Drude equation.

Table 1 shows the refractive indices, the Abbe numbers, and the partial dispersion ratio of the mixture, or the solid material, containing 3% to 30% by volume of TiO₂ particles in the UV curable resin or poly-N-vinylcarbazole for the d, g, C, and F lines.

TABLE 1

|  | Example 1<br>3% TiO₂-UV<br>curable resin | Example 2<br>7% TiO₂-UV<br>curable resin | Example 3<br>15% TiO₂-UV<br>curable resin | Example 4<br>30% TiO₂-UV<br>curable resin |
|---|---|---|---|---|
| d-Line refractive index | 1.68015 | 1.73783 | 1.84780 | 2.03807 |
| g-Line refractive index | 1.73168 | 1.80408 | 1.94081 | 2.17412 |
| C-Line refractive index | 1.67078 | 1.72608 | 1.83168 | 2.01482 |
| F-Line refractive index | 1.70634 | 1.77118 | 1.89422 | 2.10562 |
| νd | 19.1 | 16.4 | 13.6 | 11.4 |
| θgd | 1.449 | 1.469 | 1.487 | 1.498 |
| θgF | 0.713 | 0.730 | 0.745 | 0.754 |
| νdp (conditional expression 3) | 22.7 | 22.7 | 22.7 | 22.7 |
| νdn (conditional expression 4) | 9.5 | 9.5 | 9.5 | 9.5 |
| Vn (conditional expression 7) | 0.03 | 0.07 | 0.15 | 0.30 |

|  | Example 5<br>3% TiO₂-poly-N-<br>vinylcarbazole | Example 6<br>7% TiO₂-poly-N-<br>vinylcarbazole | Example 7<br>15% TiO₂-poly-N-<br>vinylcarbazole | Example 8<br>30% TiO₂-poly-N-<br>vinylcarbazole |
|---|---|---|---|---|
| d-Line refractive index | 1.73722 | 1.79083 | 1.89349 | 2.07231 |
| g-Line refractive index | 1.80344 | 1.87028 | 1.99726 | 2.21582 |
| C-Line refractive index | 1.72492 | 1.77641 | 1.87515 | 2.04748 |
| F-Line refractive index | 1.77104 | 1.83106 | 1.94556 | 2.14383 |
| νd | 16.0 | 14.5 | 12.7 | 11.1 |
| θgd | 1.436 | 1.454 | 1.474 | 1.490 |
| θgF | 0.703 | 0.718 | 0.734 | 0.747 |
| νdp (conditional | 17.7 | 17.7 | 17.7 | 17.7 |

TABLE 1-continued

| | | | | |
|---|---|---|---|---|
| expression 3) | | | | |
| νdn (conditional expression 4) | 9.5 | 9.5 | 9.5 | 9.5 |
| Vn (conditional expression 7) | 0.03 | 0.07 | 0.15 | 0.30 |

TABLE 2

| | UV curable resin | Poly-N-vinylcarbazole | $TiO_2$ |
|---|---|---|---|
| d-Line refractive index | 1.63555 | 1.69591 | 2.75753 |
| g-Line refractive index | 1.67532 | 1.75164 | 3.03431 |
| C-Line refractive index | 1.62807 | 1.68528 | 2.71051 |

TABLE 2-continued

| | UV curable resin | Poly-N-vinylcarbazole | $TiO_2$ |
|---|---|---|---|
| F-Line refractive index | 1.65604 | 1.72465 | 2.89478 |
| νd | 22.7 | 17.7 | 9.5 |
| θgd | 1.422 | 1.415 | 1.502 |
| θgF | 0.689 | 0.686 | 0.757 |

Numerical Example 1 f = 294  Fno = 4.14  2ω = 8.42°

| | | | |
|---|---|---|---|
| R1 = ∞ | D1 = 3.30 | N1 = 1.58600 | ν1 = 58.6 |
| R2 = ∞ | D2 = 0.15 | | |
| R3 = 162.690 | D3 = 8.21 | N2 = 1.55890 | ν2 = 64.0 |
| R4 = −251.172 | D4 = 0.15 | | |
| R5 = 66.606 | D5 = 8.75 | N3 = 1.60481 | ν3 = 61.1 |
| R6 = 265.183 | D6 = 3.14 | NGNL 1 = 1.68015 | νGNL 1 = 19.1 |
| * R7 = −532.002 (Aspheric surface) | D7 = 0.57 | | |
| R8 = −383.453 | D8 = 3.40 | N4 = 1.85000 | ν4 = 23.0 |
| R9 = 104.191 | D9 = 0.15 | | |
| R10 = 48.321 | D10 = 7.57 | N5 = 1.49985 | ν5 = 62.6 |
| R11 = 107.313 | D11 = 5.35 | | |
| R12 = 46.458 | D12 = 3.00 | N6 = 1.88500 | ν6 = 41.0 |
| R13 = 33.368 | D13 = 11.75 | | |
| R14 = ∞ (Aperture stop) | D14 = 4.00 | | |
| R15 = 187.724 | D15 = 2.78 | N7 = 1.80157 | ν7 = 24.3 |
| R16 = −316.566 | D16 = 2.00 | N8 = 1.88500 | ν8 = 41.0 |
| R17 = 81.708 | D17 = 31.91 | | |
| R18 = 69.788 | D18 = 1.60 | N9 = 1.85000 | ν9 = 23.0 |
| R19 = 23.904 | D19 = 6.34 | N10 = 1.61148 | ν10 = 35.5 |
| R20 = −104.831 | D20 = 0.15 | | |
| R21 = 87.745 | D21 = 3.69 | N11 = 1.86932 | ν11 = 26.1 |
| R22 = −59.288 | D22 = 1.50 | N12 = 1.78000 | ν12 = 50.0 |
| R23 = 26.884 | D23 = 8.31 | | |
| R24 = −37.061 | D24 = 1.50 | N13 = 1.78000 | ν13 = 50.0 |
| R25 = −106.602 | D25 = 0.16 | | |
| R26 = 50.963 | D26 = 11.04 | N14 = 1.50384 | ν14 = 60.8 |
| R27 = −18.774 | D27 = 1.80 | N15 = 1.48700 | ν15 = 70.4 |
| R28 = −92.230 | | | |

Aspherical coefficient

| k | B | C | D | E |
|---|---|---|---|---|
| 7th surface −2.048601E+01 | 4.397810E−09 | −1.499800E−11 | 1.168120E−15 | 1.003050E−19 |

Numerical Example 2 f = 294  Fno = 4.14  2ω = 8.42°

| | | | |
|---|---|---|---|
| R1 = ∞ | D1 = 3.30 | N1 = 1.58600 | ν1 = 58.6 |
| R2 = ∞ | D2 = 0.15 | | |
| R3 = 162.822 | D3 = 8.27 | N2 = 1.56698 | ν2 = 63.4 |
| R4 = −245.139 | D4 = 0.15 | | |
| R5 = 65.334 | D5 = 9.28 | N3 = 1.57869 | ν3 = 62.6 |
| R6 = 330.305 | D6 = 2.27 | NGNL 1 = 1.73783 | νGNL 1 = 16.4 |

-continued

Numerical Example 2

| | | | |
|---|---|---|---|
| * R7 = −999.417 (Aspheric surface) | D7 = 0.73 | | |
| R8 = −493.828 | D8 = 3.40 | N4 = 1.85000 | ν4 = 23.0 |
| R9 = 99.171 | D9 = 0.15 | | |
| R10 = 47.904 | D10 = 7.65 | N5 = 1.50541 | ν5 = 59.9 |
| R11 = 106.822 | D11 = 5.14 | | |
| R12 = 45.129 | D12 = 3.00 | N6 = 1.88500 | ν6 = 41.0 |
| R13 = 32.982 | D13 = 11.93 | | |
| R14 = ∞ (Aperture stop) | D14 = 4.00 | | |
| R15 = 183.761 | D15 = 2.82 | N7 = 1.79561 | ν7 = 24.5 |
| R16 = −309.083 | D16 = 2.00 | N8 = 1.88500 | ν8 = 41.0 |
| R17 = 81.708 | D17 = 31.89 | | |
| R18 = 69.022 | D18 = 1.60 | N9 = 1.85000 | ν9 = 23.0 |
| R19 = 23.838 | D19 = 6.36 | N10 = 1.61050 | ν10 = 35.6 |
| R20 = −104.944 | D20 = 0.15 | | |
| R21 = 87.987 | D21 = 3.70 | N11 = 1.85934 | ν11 = 26.2 |
| R22 = −58.833 | D22 = 1.50 | N12 = 1.78000 | ν12 = 50.0 |
| R23 = 26.904 | D23 = 8.30 | | |
| R24 = −36.998 | D24 = 1.50 | N13 = 1.78000 | ν13 = 50.0 |
| R25 = −107.405 | D25 = 0.17 | | |
| R26 = 51.424 | D26 = 11.05 | N14 = 1.50479 | ν14 = 60.9 |
| R27 = −18.723 | D27 = 1.80 | N15 = 1.48700 | ν15 = 70.4 |
| R28 = −91.072 | | | |

Aspherical coefficient

| k | B | C | D | E |
|---|---|---|---|---|
| 7th surface −8.069647E+01 | 1.762750E−08 | −1.363130E−11 | 4.711310E−16 | 1.804270E−19 |

Numerical Example 3 f = 294 Fno = 4.14 2ω = 8.42°

| | | | |
|---|---|---|---|
| R1 = ∞ | D1 = 3.30 | N1 = 1.58600 | ν1 = 58.6 |
| R2 = ∞ | D2 = 0.15 | | |
| R3 = 160.801 | D3 = 8.29 | N2 = 1.58618 | ν2 = 62.2 |
| R4 = −247.973 | D4 = 0.15 | | |
| R5 = 64.636 | D5 = 9.65 | N3 = 1.56785 | ν3 = 63.4 |
| R6 = 409.693 | D6 = 1.57 | NGNL 1 = 1.84780 | νGNL 1 = 13.6 |
| * R7 = −4177.366 (Aspheric surface) | D7 = 0.93 | | |
| R8 = −597.305 | D8 = 3.40 | N4 = 1.85000 | ν4 = 23.0 |
| R9 = 95.139 | D9 = 0.15 | | |
| R10 = 47.608 | D10 = 7.69 | N5 = 1.50715 | ν5 = 59.1 |
| R11 = 106.797 | D11 = 4.90 | | |
| R12 = 44.280 | D12 = 3.00 | N6 = 1.88500 | ν6 = 41.0 |
| R13 = 32.715 | D13 = 12.03 | | |
| R14 = ∞ (Aperture stop) | D14 = 4.00 | | |
| R15 = 181.632 | D15 = 2.83 | N7 = 1.79253 | ν7 = 24.6 |
| R16 = −310.398 | D16 = 2.00 | N8 = 1.88500 | ν8 = 41.0 |
| R17 = 81.708 | D17 = 31.88 | | |
| R18 = 68.001 | D18 = 1.60 | N9 = 1.85000 | ν9 = 23.0 |
| R19 = 23.825 | D19 = 6.37 | N10 = 1.60942 | ν10 = 35.7 |
| R20 = −105.367 | D20 = 0.15 | | |
| R21 = 89.938 | D21 = 3.69 | N11 = 1.85889 | ν11 = 26.0 |
| R22 = −58.478 | D22 = 1.50 | N12 = 1.78051 | ν12 = 49.9 |
| R23 = 26.993 | D23 = 8.31 | | |
| R24 = −36.914 | D24 = 1.50 | N13 = 1.78000 | ν13 = 50.0 |
| R25 = −105.160 | D25 = 0.15 | | |
| R26 = 51.601 | D26 = 11.10 | N14 = 1.50430 | ν14 = 61.0 |
| R27 = −18.626 | D27 = 1.80 | N15 = 1.48700 | ν15 = 70.4 |
| R28 = −90.723 | | | |

Aspherical coefficient

| k | B | C | D | E |
|---|---|---|---|---|
| 7th surface 4.248174E+01 | 1.804250E−08 | −1.097370E−11 | 1.323540E−16 | 1.224010E−19 |

Numerical Example 4 f = 294 Fno = 4.14 2ω = 8.42°

|   | | | |
|---|---|---|---|
| R1 = ∞ | D1 = 3.30 | N1 = 1.58600 | ν1 = 58.6 |
| R2 = ∞ | D2 = 0.15 | | |
| R3 = 149.932 | D3 = 8.33 | N2 = 1.62000 | ν2 = 60.3 |
| R4 = −275.392 | D4 = 0.15 | | |
| R5 = 63.691 | D5 = 9.79 | N3 = 1.55064 | ν3 = 64.6 |
| R6 = 432.709 | D6 = 1.11 | NGNL 1 = 2.03807 | νGNL 1 = 11.4 |
| * R7 = 1903.473 (Aspheric surface) | D7 = 1.10 | | |
| R8 = −794.061 | D8 = 3.40 | N4 = 1.85000 | ν4 = 23.0 |
| R9 = 89.371 | D9 = 0.15 | | |
| R10 = 47.809 | D10 = 7.70 | N5 = 1.50503 | ν5 = 60.1 |
| R11 = 110.075 | D11 = 4.54 | | |
| R12 = 43.430 | D12 = 3.00 | N6 = 1.88500 | ν6 = 41.0 |
| R13 = 32.562 | D13 = 12.11 | | |
| R14 = ∞ (Aperture stop) | D14 = 4.00 | | |
| R15 = 185.552 | D15 = 2.81 | N7 = 1.79618 | ν7 = 24.5 |
| R16 = −314.843 | D16 = 2.00 | N8 = 1.88500 | ν8 = 41.0 |
| R17 = 81.708 | D17 = 31.89 | | |
| R18 = 66.313 | D18 = 1.60 | N9 = 1.85000 | ν9 = 23.0 |
| R19 = 23.797 | D19 = 6.36 | N10 = 1.60787 | ν10 = 35.9 |
| R20 = −108.085 | D20 = 0.15 | | |
| R21 = 91.110 | D21 = 3.70 | N11 = 1.85859 | ν11 = 25.9 |
| R22 = −57.576 | D22 = 1.50 | N12 = 1.78310 | ν12 = 49.6 |
| R23 = 27.149 | D23 = 8.30 | | |
| R24 = −37.012 | D24 = 1.50 | N13 = 1.78000 | ν13 = 50.0 |
| R25 = −104.688 | D25 = 0.15 | | |
| R26 = 52.036 | D26 = 11.14 | N14 = 1.50429 | ν14 = 60.9 |
| R27 = −18.537 | D27 = 1.80 | N15 = 1.48700 | ν15 = 70.4 |
| R28 = −89.955 | | | |

Aspherical coefficient

| k | B | C | D | E |
|---|---|---|---|---|
| 7th surface −2.262309E+02 | 1.499600E−08 | 8.067630E−12 | −2.201080E−16 | 1.427770E−19 |

Numerical Example 5 f = 294 Fno = 4.14 2ω = 8.42°

|   | | | |
|---|---|---|---|
| R1 = ∞ | D1 = 3.30 | N1 = 1.58600 | ν1 = 58.6 |
| R2 = ∞ | D2 = 0.15 | | |
| R3 = 260.123 | D3 = 7.71 | N2 = 1.50976 | ν2 = 68.0 |
| R4 = −181.846 | D4 = 0.15 | | |
| R5 = 61.820 | D5 = 9.62 | N3 = 1.60089 | ν3 = 61.3 |
| R6 = 268.044 | D6 = 2.96 | NGNL 1 = 1.73722 | νGNL 1 = 16.0 |
| * R7 = −643.102 (Aspheric surface) | D7 = 0.72 | | |
| R8 = −394.076 | D8 = 3.40 | N4 = 1.85000 | ν4 = 23.0 |
| R9 = 85.612 | D9 = 0.15 | | |
| R10 = 49.908 | D10 = 7.86 | N5 = 1.52804 | ν5 = 62.8 |
| R11 = 123.970 | D11 = 4.70 | | |
| R12 = 39.457 | D12 = 3.00 | N6 = 1.88500 | ν6 = 41.0 |
| R13 = 31.253 | D13 = 12.75 | | |
| R14 = ∞ (Aperture stop) | D14 = 4.00 | | |
| R15 = 184.004 | D15 = 2.86 | N7 = 1.79937 | ν7 = 24.4 |
| R16 = −302.225 | D16 = 2.00 | N8 = 1.88500 | ν8 = 41.0 |
| R17 = 81.708 | D17 = 31.90 | | |
| R18 = 67.955 | D18 = 1.60 | N9 = 1.85000 | ν9 = 23.0 |
| R19 = 23.759 | D19 = 6.35 | N10 = 1.60824 | ν10 = 35.9 |
| R20 = −108.292 | D20 = 0.15 | | |
| R21 = 90.254 | D21 = 3.71 | N11 = 1.85924 | ν11 = 26.1 |
| R22 = −57.443 | D22 = 1.50 | N12 = 1.78000 | ν12 = 50.0 |
| R23 = 27.032 | D23 = 8.29 | | |
| R24 = −36.833 | D24 = 1.50 | N13 = 1.78000 | ν13 = 50.0 |
| R25 = −106.888 | D25 = 0.23 | | |
| R26 = 52.506 | D26 = 11.09 | N14 = 1.50523 | ν14 = 61.4 |
| R27 = −18.583 | D27 = 1.80 | N15 = 1.48700 | ν15 = 70.4 |
| R28 = −87.338 | | | |

-continued

Numerical Example 5

Aspherical coefficient

| | k | B | C | D | E |
|---|---|---|---|---|---|
| 7th surface | −3.064038E+01 | 2.394410E−08 | −2.044280E−11 | 1.278840E−15 | 1.114520E−19 |

Numerical Example 6 f = 294 Fno = 4.14 2ω = 8.42°

| | | | |
|---|---|---|---|
| R1 = ∞ | D1 = 3.30 | N1 = 1.58500 | ν1 = 58.6 |
| R2 = ∞ | D2 = 0.15 | | |
| R3 = 226.682 | D3 = 7.76 | N2 = 1.54842 | ν2 = 64.7 |
| R4 = −198.808 | D4 = 0.15 | | |
| R5 = 61.266 | D5 = 9.94 | N3 = 1.58242 | ν3 = 62.4 |
| R6 = 316.789 | D6 = 2.23 | NGNL 1 = 1.79083 | νGNL 1 = 14.5 |
| * R7 = −1288.957 (Aspheric surface) | D7 = 0.85 | | |
| R8 = −493.191 | D8 = 3.40 | N4 = 1.85000 | ν4 = 23.0 |
| R9 = 84.952 | D9 = 0.15 | | |
| R10 = 48.369 | D10 = 7.95 | N5 = 1.51395 | ν5 = 59.6 |
| R11 = 117.840 | D11 = 4.23 | | |
| R12 = 40.000 | D12 = 3.00 | N6 = 1.88500 | ν6 = 41.0 |
| R13 = 31.318 | D13 = 12.72 | | |
| R14 = ∞ (Aperture stop) | D14 = 4.00 | | |
| R15 = 181.429 | D15 = 2.87 | N7 = 1.79497 | ν7 = 24.5 |
| R16 = −304.832 | D16 = 2.00 | N8 = 1.88500 | ν8 = 41.0 |
| R17 = 81.708 | D17 = 31.87 | | |
| R18 = 66.804 | D18 = 1.60 | N9 = 1.85000 | ν9 = 23.0 |
| R19 = 23.686 | D19 = 6.38 | N10 = 1.60711 | ν10 = 36.0 |
| R20 = −108.026 | D20 = 0.15 | | |
| R21 = 90.358 | D21 = 3.71 | N11 = 1.85907 | ν11 = 26.1 |
| R22 = −57.398 | D22 = 1.50 | N12 = 1.78000 | ν12 = 50.0 |
| R23 = 26.982 | D23 = 8.29 | | |
| R24 = −36.747 | D24 = 1.50 | N13 = 1.78000 | ν13 = 50.0 |
| R25 = −107.048 | D25 = 0.15 | | |
| R26 = 52.408 | D26 = 11.12 | N14 = 1.50542 | ν14 = 61.2 |
| R27 = −18.498 | D27 = 1.80 | N15 = 1.48700 | ν15 = 70.4 |
| R28 = −87.117 | | | |

Aspherical coefficient

| | k | B | C | D | E |
|---|---|---|---|---|---|
| 7th surface | −4.747131E+01 | 2.716100E−08 | −1.697160E−11 | 6.307630E−16 | 1.630510E−19 |

Numerical Example 7 f = 294 Fno = 4.14 2ω = 8.42°

| | | | |
|---|---|---|---|
| R1 = ∞ | D1 = 3.30 | N1 = 1.58600 | ν1 = 58.6 |
| R2 = ∞ | D2 = 0.15 | | |
| R3 = 180.910 | D3 = 8.00 | N2 = 1.58808 | ν2 = 62.1 |
| R4 = −233.927 | D4 = 0.15 | | |
| R5 = 61.720 | D5 = 9.98 | N3 = 1.56600 | ν3 = 63.5 |
| R6 = 364.260 | D6 = 1.58 | NGNL 1 = 1.89349 | νGNL 1 = 12.7 |
| * R7 = 20917.130 (Aspheric surface) | D7 = 0.98 | | |
| R8 = −684.184 | D8 = 3.40 | N4 = 1.85000 | ν4 = 23.0 |
| R9 = 84.195 | D9 = 0.15 | | |
| R10 = 47.964 | D10 = 7.89 | N5 = 1.50739 | ν5 = 59.0 |
| R11 = 115.288 | D11 = 4.17 | | |
| R12 = 41.271 | D12 = 3.00 | N6 = 1.88500 | ν6 = 41.0 |
| R13 = 31.864 | D13 = 12.48 | | |
| R14 = ∞ (Aperture stop) | D14 = 4.00 | | |
| R15 = 180.508 | D15 = 2.87 | N7 = 1.79136 | ν7 = 24.6 |
| R16 = −307.110 | D16 = 2.00 | N8 = 1.88500 | ν8 = 41.0 |
| R17 = 81.708 | D17 = 31.87 | | |
| R18 = 66.734 | D18 = 1.60 | N9 = 1.85000 | ν9 = 23.0 |
| R19 = 23.734 | D19 = 6.38 | N10 = 1.60728 | ν10 = 36.0 |

-continued

Numerical Example 7

| | | | |
|---|---|---|---|
| R20 = −107.697 | D20 = 0.15 | | |
| R21 = 91.352 | D21 = 3.71 | N11 = 1.85911 | ν11 = 26.1 |
| R22 = −57.206 | D22 = 1.50 | N12 = 1.78000 | ν12 = 50.0 |
| R23 = 27.071 | D23 = 8.29 | | |
| R24 = −36.781 | D24 = 1.50 | N13 = 1.78000 | ν13 = 50.0 |
| R25 = −105.589 | D25 = 0.15 | | |
| R26 = 52.467 | D26 = 11.13 | N14 = 1.50513 | ν14 = 60.9 |
| R27 = −18.503 | D27 = 1.80 | N15 = 1.48700 | ν15 = 70.4 |
| R28 = −87.737 | | | |

Aspherical coefficient

| k | B | C | D | E |
|---|---|---|---|---|
| 7th surface 0.000000E+00 | 2.181800E−08 | −1.202290E−11 | 2.500520E−17 | 2.047440E−19 |

Numerical Example 8 f = 294 Fno = 4.14 2ω = 8.42°

| | | | |
|---|---|---|---|
| R1 = ∞ | D1 = 3.30 | N1 = 1.58600 | ν1 = 58.6 |
| R2 = ∞ | D2 = 0.15 | | |
| R3 = 149.703 | D3 = 8.35 | N2 = 1.61687 | ν2 = 60.5 |
| R4 = −273.806 | D4 = 0.15 | | |
| R5 = 62.783 | D5 = 9.96 | N3 = 1.55341 | ν3 = 64.4 |
| R6 = 443.952 | D6 = 1.12 | NGNL 1 = 2.07231 | νGNL 1 = 11.1 |
| * R7 = 2314.684 | D7 = 1.06 | | |
| R8 = −783.184 | D8 = 3.40 | N4 = 1.85000 | ν4 = 23.0 |
| R9 = 84.263 | D9 = 0.15 | | |
| R10 = 48.012 | D10 = 7.69 | N5 = 1.50808 | ν5 = 58.7 |
| R11 = 112.027 | D11 = 4.39 | | |
| R12 = 42.859 | D12 = 3.00 | N6 = 1.88500 | ν6 = 41.0 |
| R13 = 32.512 | D13 = 12.15 | | |
| R14 = ∞ (Aperture stop) | D14 = 4.00 | | |
| R15 = −183.080 | D15 = 2.84 | N7 = 1.79138 | ν7 = 24.6 |
| R16 = −306.051 | D16 = 2.00 | N8 = 1.88500 | ν8 = 41.0 |
| R17 = 81.708 | D17 = 31.86 | | |
| R18 = 65.709 | D18 = 1.60 | N9 = 1.85000 | ν9 = 23.0 |
| R19 = 23.781 | D19 = 6.39 | N10 = 1.60627 | ν10 = 36.1 |
| R20 = −107.687 | D20 = 0.15 | | |
| R21 = 90.900 | D21 = 3.72 | N11 = 1.85883 | ν11 = 26.0 |
| R22 = −57.389 | D22 = 1.50 | N12 = 1.78226 | ν12 = 49.7 |
| R23 = 27.128 | D23 = 8.28 | | |
| R24 = −36.970 | D24 = 1.50 | N13 = 1.78000 | ν13 = 50.0 |
| R25 = −106.109 | D25 = 0.15 | | |
| R26 = 52.337 | D26 = 11.16 | N14 = 1.50467 | ν14 = 60.8 |
| R27 = −18.497 | D27 = 1.80 | N15 = 1.48700 | ν15 = 70.4 |
| R28 = −88.434 | | | |

Aspherical coefficient

| k | B | C | D | E |
|---|---|---|---|---|
| 7th surface 5.257843E+01 | 1.472590E−08 | 8.872300E−12 | −2.023010E−16 | 1.567250E−19 |

A digital still camera as the image pick-up apparatus according to an embodiment of the present invention will now be described with reference to FIG. 18. The digital still camera includes an optical system according to an embodiment of the invention as the optical shooting system.

Figure 18:
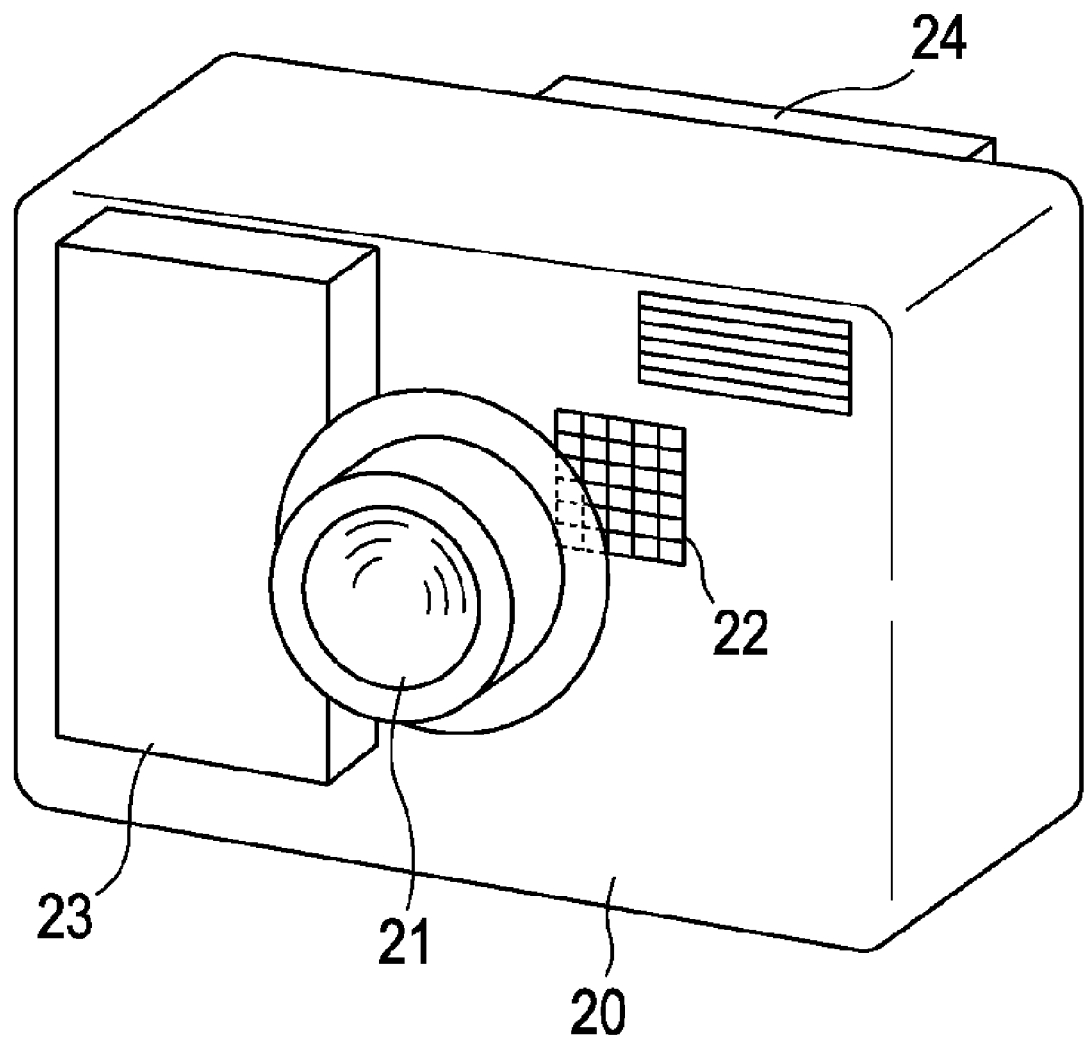
FIG. 18 is a schematic representation of an image pick-up device.

As shown in FIG. 18, a camera body 20 has an optical system 21. The camera body 20 contains a solid image pick-up element (photoelectric conversion element) 22, such as a CCD sensor or a CMOS sensor, that receives images formed by the optical system 21. A memory 23 is also provided to the camera 20. The memory 23 records information corresponding to images photoelectrically converted by the image pick-up element 22. The camera also has a finder 24 including a liquid crystal display panel for observing object images formed on the solid image pick-up element 22.

By using the present optical system in image pick-up elements, such as digital still cameras, the resulting image pick-up device can be small and exhibit high optical properties.

Figure 19:
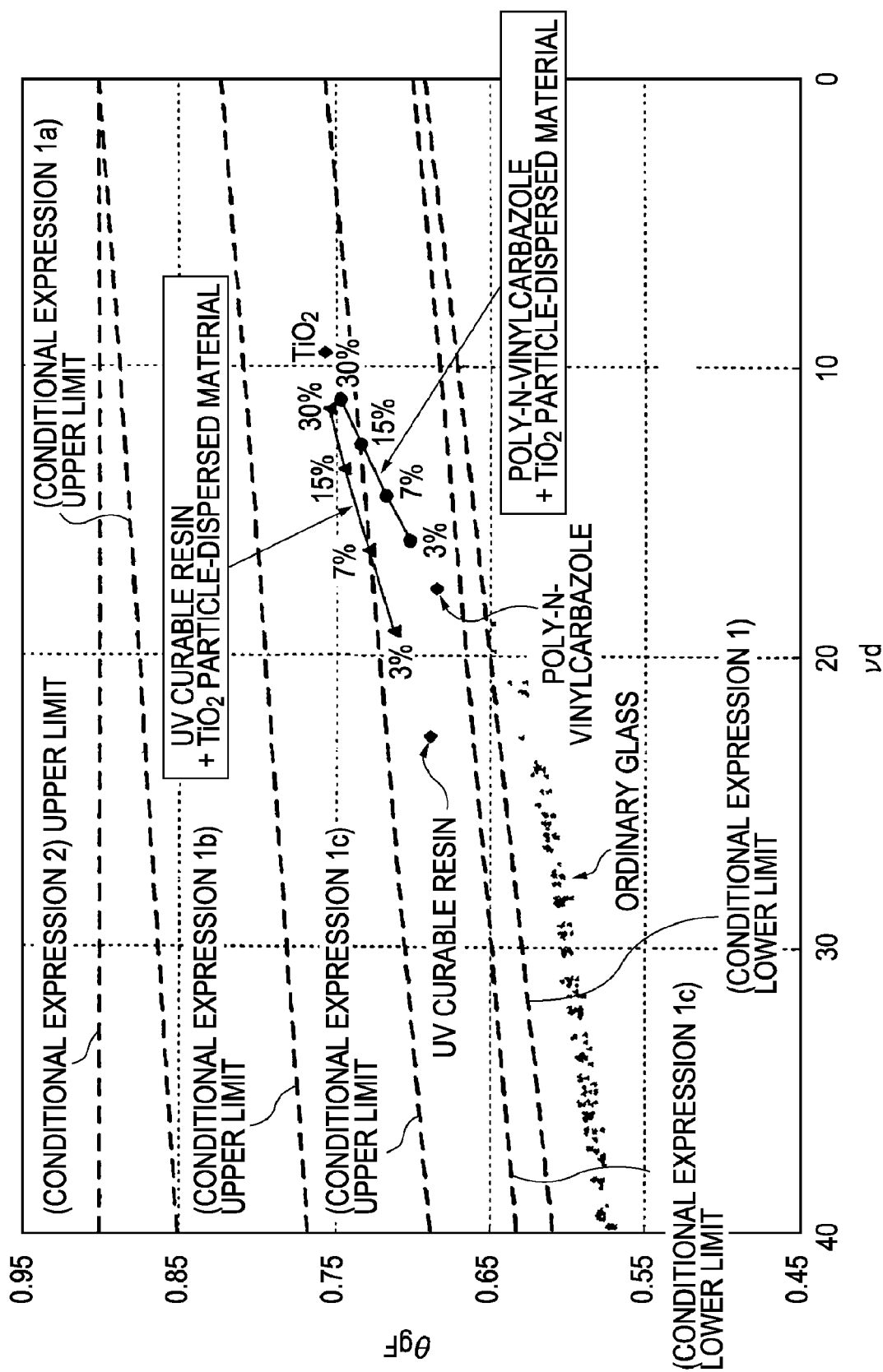
FIG. 19 is a graphic representation showing the relationship between Abbe number and partial dispersion ratio.
Figure 20:
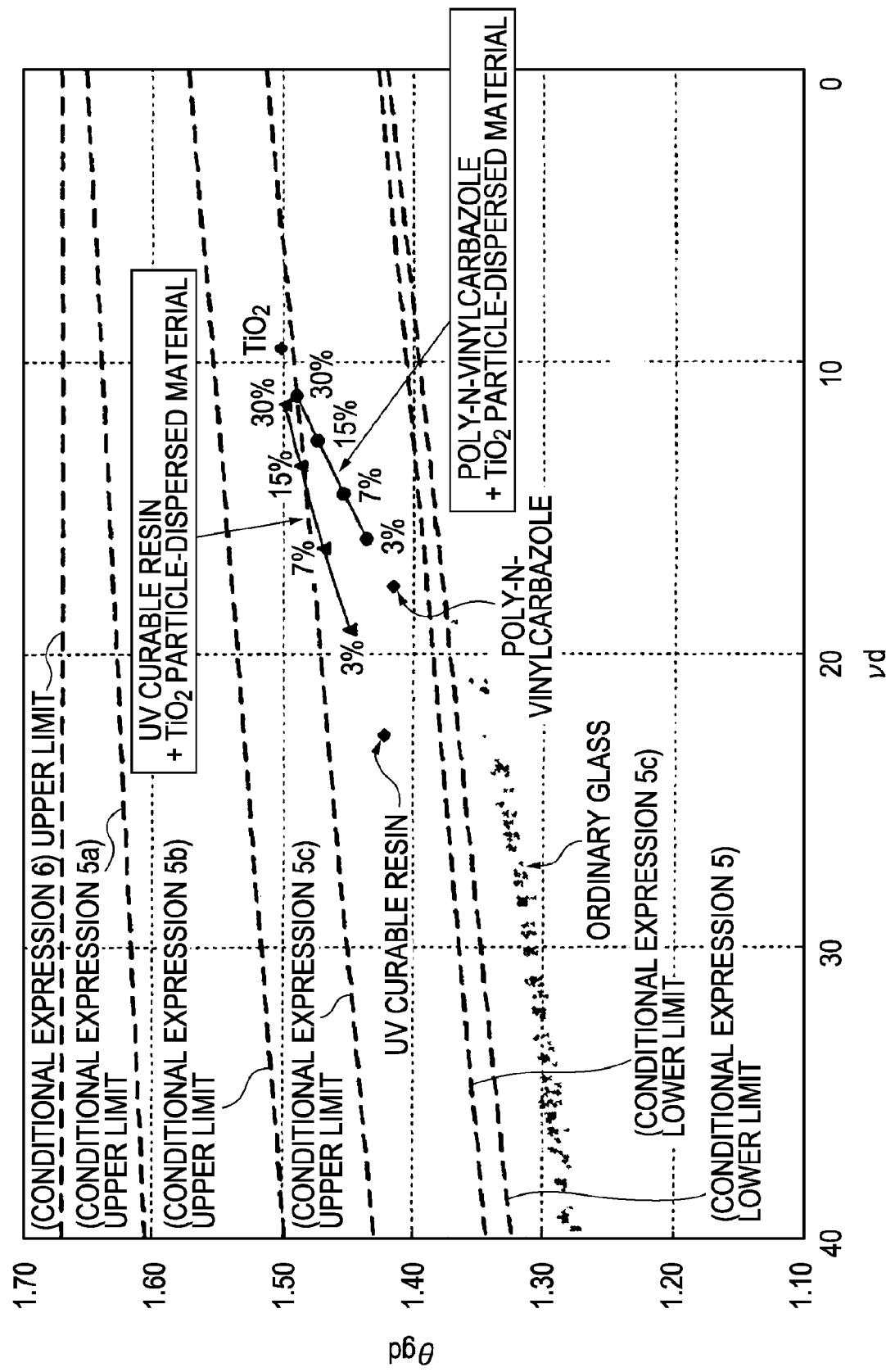
FIG. 20 is a graphic representation showing the relationship between Abbe number and partial dispersion ratio.

FIG. 19 shows the relationship between the Abbe number νd and the partial dispersion ratio θgF of the materials shown in Tables 1 and 2 and an ordinary optical glass, with the ranges of conditional expressions (1) and (2). FIG. 20 shows the relationship between the Abbe number νd and the partial dispersion ratio θgd of the materials shown in Tables 1 and 2 and a generally used optical glass, with the ranges of conditional expressions (5) and (6).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Application No. 2005-354792 filed Dec. 8, 2005, which is hereby incorporated by reference herein in its entirety.

What is claimed is:

1. An optical system comprising:

an optical member made of a solid material being a mixture in which inorganic particles are dispersed in a transparent medium, the optical member having refracting surfaces on sides from which light enters and from which light exits, wherein the solid material satisfies the following expressions:

$-2.100 \times 10^{-3} \cdot vd + 0.693 < \theta gF;$ $0.555 < \theta gF < 0.9;$ $vdp < 35;$ $vdn < 30;$ and $Vn < 0.35,$ where $vdp$ represents the Abbe number of the transparent medium, $vdn$ represents the Abbe number of the inorganic particles, $vd$ represents the Abbe number of the mixture, $\theta gF$ represents a partial dispersion ratio (Ng−NF)/(NF−NC) of the mixture and Ng, NF, and NC are refractive indices of the mixture for the g, F, and C lines respectively, and Vn represents the volume ratio of the inorganic particles to the transparent medium.

2. The optical system according to claim 1, wherein the mixture satisfies the following expressions:

$-2.407 \times 10^{-3} \cdot vd + 1.420 < \theta gd;$ and $1.255 < \theta gd < 1.67,$ where $\theta gd$ represents a partial dispersion ratio (Ng−Nd)/(NF−NC) of the mixture and Nd is the refractive index of the mixture for the d line.

3. The optical system according to claim 1, further comprising an aperture stop, wherein the optical system has an optical overall length shorter than the focal length thereof, and the optical member has a positive refractive power and disposed on the front side of the aperture stop.

4. The optical system according to claim 1, wherein the optical system forms an image on a photoelectric conversion element.

5. An optical apparatus comprising the optical system as set forth in claim 1.

6. An image pick-up apparatus comprising:

the optical system as set forth in claim 1; and a photoelectric conversion element for receiving an image formed by the optical system.

* * * * *